(12) United States Patent
Cates

(10) Patent No.: US 8,276,020 B2
(45) Date of Patent: *Sep. 25, 2012

(54) SYSTEMS AND METHODS FOR AUTOMATED DETERMINATION OF ERROR HANDLING

(75) Inventor: Claire Cates, Carolina Beach, NC (US)

(73) Assignee: SAS Institute Inc., Cary, NC (US)

( * ) Notice: Subject to any disclaimer, the term of this patent is extended or adjusted under 35 U.S.C. 154(b) by 85 days.

This patent is subject to a terminal disclaimer.

(21) Appl. No.: 12/835,348

(22) Filed: Jul. 13, 2010

(65) Prior Publication Data

US 2010/0281303 A1 Nov. 4, 2010

Related U.S. Application Data

(63) Continuation-in-part of application No. 12/406,363, filed on Mar. 18, 2009, now Pat. No. 7,904,754.

(51) Int. Cl.
*G06F 11/00* (2006.01)
(52) U.S. Cl. .................. 714/28; 714/32; 714/33; 714/45
(58) Field of Classification Search .................... 714/28, 714/32, 33, 45
See application file for complete search history.

(56) References Cited

U.S. PATENT DOCUMENTS

| 5,724,590 | A | | 3/1998 | Goettelmann et al. |
| 5,732,272 | A | | 3/1998 | Gochee |
| 5,828,883 | A | | 10/1998 | Hall |
| 5,963,739 | A | | 10/1999 | Homeier |
| 6,096,089 | A | * | 8/2000 | Kageshima ..................... 703/18 |
| 6,560,773 | B1 | | 5/2003 | Alexander, III et al. |
| 6,598,105 | B1 | * | 7/2003 | Oshins et al. ................. 710/264 |
| 6,678,883 | B1 | * | 1/2004 | Berry et al. .................... 717/128 |
| 6,718,485 | B1 | * | 4/2004 | Reiser .......................... 714/38.1 |
| 6,782,462 | B2 | | 8/2004 | Marion et al. |
| 6,912,675 | B2 | * | 6/2005 | Swoboda ........................ 714/45 |
| 6,934,935 | B1 | | 8/2005 | Bennett et al. |
| 6,978,401 | B2 | | 12/2005 | Avvari et al. |
| 7,079,688 | B1 | | 7/2006 | Deco et al. |
| 7,093,241 | B2 | | 8/2006 | Hsieh et al. |
| 7,139,676 | B2 | * | 11/2006 | Barford ......................... 702/183 |

(Continued)

OTHER PUBLICATIONS

Cates, Claire S., U.S. Appl. No. 11/656,676, filed Jan. 23, 2007, entitled "System and Method for Determining Execution Path Differences in a Program".

(Continued)

*Primary Examiner* — Joshua Lohn
(74) *Attorney, Agent, or Firm* — Jones Day

(57) ABSTRACT

Systems and methods for automated determination of error handling. Data is received including one or more procedural operations to be tested. A first test is run on the data to capture one or more first tracebacks, where each traceback is associated with a procedural operation. A determination is made as to whether each captured first traceback is unique, where unique tracebacks are added to a unique traceback list. An error condition is simulated on each unique traceback on the unique traceback list by running a second test. The second test is run once for each unique traceback. One or more second tracebacks are captured during each run of the second test. When a unique traceback being tested matches a captured second traceback, an error code is returned and the second test may be run to completion. Errors encountered during each iteration of the second test running to completion are identified.

20 Claims, 21 Drawing Sheets

U.S. PATENT DOCUMENTS

| | | | |
|---|---|---|---|
| 7,143,392 | B2 | 11/2006 | Li et al. |
| 7,165,190 | B1 | 1/2007 | Srivastava et al. |
| 7,167,821 | B2* | 1/2007 | Hardwick et al. ............... 703/22 |
| 7,184,944 | B1* | 2/2007 | Rieschl et al. ................... 703/21 |
| 7,257,692 | B2 | 8/2007 | Schumacher |
| 7,292,969 | B1* | 11/2007 | Aharoni et al. .................. 703/21 |
| 7,409,679 | B2 | 8/2008 | Chedgey et al. |
| 7,461,302 | B2 | 12/2008 | Halevy |
| 7,506,319 | B2 | 3/2009 | Purcell et al. |
| 7,509,632 | B2 | 3/2009 | Boger |
| 7,512,765 | B2* | 3/2009 | Kurtz ............................ 711/170 |
| 7,590,894 | B2* | 9/2009 | Swoboda et al. ................ 714/45 |
| 7,721,269 | B2 | 5/2010 | Cates |
| 7,904,754 | B2* | 3/2011 | Cates ............................. 714/33 |
| 7,908,518 | B2* | 3/2011 | West et al. ...................... 714/28 |
| 2003/0056199 | A1 | 3/2003 | Li et al. |
| 2004/0015880 | A1 | 1/2004 | Floyd et al. |
| 2005/0114843 | A1 | 5/2005 | Gilgen et al. |
| 2005/0166094 | A1 | 7/2005 | Blackwell et al. |
| 2005/0183074 | A1 | 8/2005 | Alexander et al. |
| 2005/0183075 | A1 | 8/2005 | Alexander et al. |
| 2005/0235127 | A1 | 10/2005 | Muthiah et al. |
| 2006/0010352 | A1 | 1/2006 | Mukherjee et al. |
| 2006/0085156 | A1 | 4/2006 | Kolawa et al. |
| 2007/0011428 | A1 | 1/2007 | Kurtz |
| 2007/0169051 | A1 | 7/2007 | Krauss |
| 2008/0177526 | A1* | 7/2008 | Kano et al. ...................... 703/22 |
| 2009/0063905 | A1 | 3/2009 | Latten et al. |
| 2009/0210750 | A1* | 8/2009 | Cates ............................. 714/42 |
| 2009/0307528 | A1* | 12/2009 | Byers et al. ..................... 714/32 |
| 2010/0106933 | A1* | 4/2010 | Kamila et al. ................. 711/171 |
| 2010/0218149 | A1* | 8/2010 | Sasaki ............................... 716/5 |
| 2010/0241908 | A1* | 9/2010 | Cates ............................. 714/45 |
| 2010/0281303 | A1* | 11/2010 | Cates ............................. 714/33 |

OTHER PUBLICATIONS

Cates, Claire S., U.S. Appl. No. 12/033,593, filed Feb. 19, 2008, entitled "Systems and Methods for Identifying Memory Leaks in a Computer System".

Cates, Claire S., U.S. Appl. No. 12/062,777, filed Apr. 4, 2008, entitled "Systems and Methods for Interactions With Software Probes".

Aranya, Akshat et al., "Tracefs: A File System to Trace Them All", Appears in the proceedings of the Third USENIX Conference on File and Storage Technologies (FAST 2004), pp. 1-15.

Bernat, Andrew R. et al., "Incremental Call-Path Profiling," Concurrency and Computation: Practice and Experience, vol. 19, Issue 11, pp. 1533-1547 (2007).

Lee, Soojung, "Fast, Centralized Detection and Resolution of Distributed Deadlocks in the Generalized Model," IEEE Transactions on Software Engineering, vol. 30, No. 9, pp. 561-573 (Sep. 2004).

Wu, Jingwei et al., "A Multi-Perspective Software Visualization Environment," IBM Press, pp. 1-10 (2000).

OC Systems Aprobe Technology, http://www.ocsytems.com/tech_aprobe.html, 2 pp., Available Apr. 4, 2008.

OC Systems, RootCause Speeds Resolution of Performance Bottlenecks, Memory Leaks and . . . http://www.ocsystems.com/prod_rootcause.html (2pp.), Available Apr. 4, 2008.

OC Systems SAS RootCause Client Profile, http://www.ocsystems.com/casestudy_sas.html, 2 pp, Available Apr. 4, 2008.

Hitchhiker Lifecycle Application Diagnostics for C/C++, http://www.ocsystems.com/eclipse/index.html, 2 pp, Available Apr. 4, 2008.

Undated paper entitled "How' Your Memory" by Claire Cafes at SAS (10pp.), Available Apr. 14, 2008.

Ammons, Glen et al., "Finding and Removing Performance Bottlenecks in Large Systems", undated 26 pp, Available Apr. 17, 2008.

Ayers, Andrew et al., "TraceBack: First Fault Diagnosis by Reconstruction of Distributed Control Flow", PLDI '05, pp. 201-212 (Jun. 12-15, 2005).

Begie, Goran, "An introduction to runtime analysis with Rational PurifyPlus", Nov. 19, 2003, 11 pp.

Chilmbi, Toshul M. et al., "Low-Overhead Memory Leak Detection Using Adaptive Statisical Profiling", ASPLOS '04, Oct. 9-13, 2004, pp. 156-164.

Cole, Oliver, "Aprobe: A Non-intrusive Framework for Software Instrumentation", OC Systems, Inc., pp. 1-10, Available Apr. 4, 2008.

Jump, Maria et al., "Cork: Dynamic Memory Leak Detection for Java", Technical Report TR-06-07, Jan. 2006, 10 pp.

Pevzner, P.A. et al., "Multiple Filtration and Approximate Pattern Matching", Algorithmica, 13, pp. 135-154 (1995).

Spivey, J.M., "Fast, accurate call graph profiling", Software Practice and Experience, vol. 34, issue 3, pp. 249-264 [2004].

Williams, Amy Lynne, "Static Detection of Deadlock for Java Libraries", Massachusetts Institute of Technology, 67 pp. (2005).

Xie, Tao et al., "An Empirical Study of Java Dynamic Call Graph Extractors", University of Washington Technical Report, pp. 1-11 [Feb. 12, 2003].

* cited by examiner

```
Cmd.exe-rcnull\\tstsrc\tst\dev\tst-v920\tkeds\testsrc\d2e1ar27.sas-only TKEDSExecute-auto...

C:\memory>
C:\memory>
C:\memory>
C:\memory> ria -config \null.cfg

C:\memory> rcnull \\tstsrc\tst\dev\tst-v920\tkeds\testsrc\d2e1ar27.sas -only TKED
SExecute -autoexec \\tstsrc\tst\dev\tst-v920\tkeds\testsrc\d2auto.sas C:\memory> echo off
Registry updated.
Adding Program: "C:\SASv9\sasgen\dev\mva-v920\sas_dvd\com\dntno\sas.exe" (c:\SAS
v9\sasgen\dev\mva-v920\sas_dvd\com\dntno\sas.exe) -> "c:\probes\null.aws"
Registry updated.
RootCause registry found and RootCause is ENABLED
for registered applications.
-----------
Null probe active Executing rcnull on file \\tstsrc\tst\dev\tst-v920\tkeds\testsrc\d2e1ar27.sas sdssas xyzdgf.sas -autoexec \\tstsrc\tst\dev\tst-v920\tkeds\testsrc\d2auto.sas
DNT/SDSSAS Version 4.0-08-0529.0918
NOTE <sdssas>: STARTED ... 2008/06/04.11:34:30
NOTE <sdssas>: ISERVER ... yosemite:anvil
NOTE <sdssas>: IMGTO ... 10
NOTE <sdssas>: WARNING .... Using tag=m901 for GISMAPS!
NOTE <sdssas>: PLAYPEN .... -path       C:\memory\com\dntno
NOTE <sdssas>: PLAYPEN .... -resourcesloc C:\memory\com\dntno
Invoking SAS, dev/mva-v920.dntno.DVD [dev/mva-v920/dntno/sas-dvd sas.exe] ...
C:\SASv9\sasgen\dev\mva-v920\sas_dvd\com\dntno\sas.exe xyzdgf.sas -config C:\SAS
v9\tmp\SASv9-2180.cfg -sashost C:\SASv9\sasgen\dev\mva-v920\sas_dvd\com\dntno\sa
shost.dll -autoexec \\tstsrc\tst\dev\tst-v920\tkeds\testsrc\d2auto.sas
```

Fig. 10

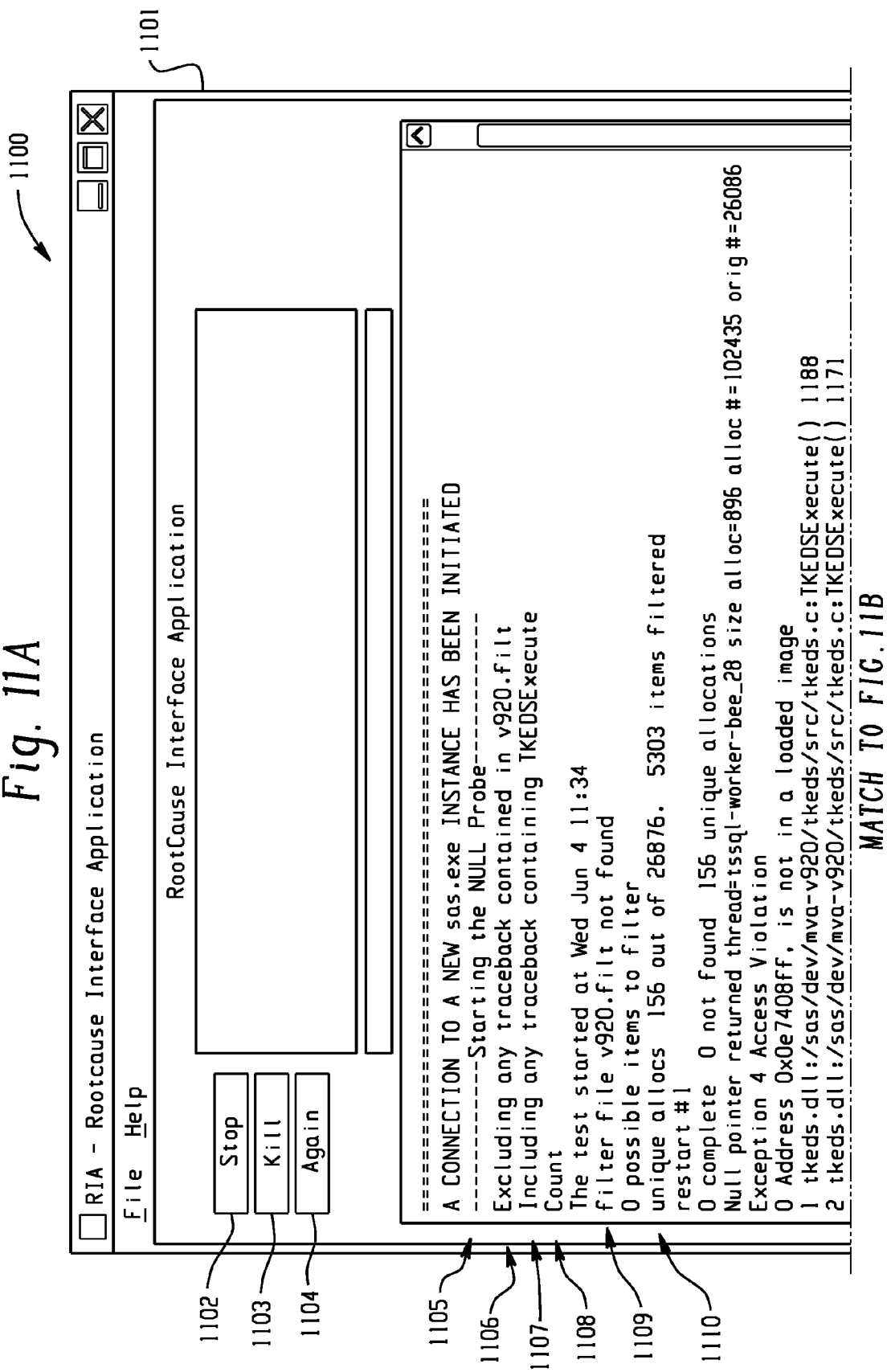

Fig. 11B

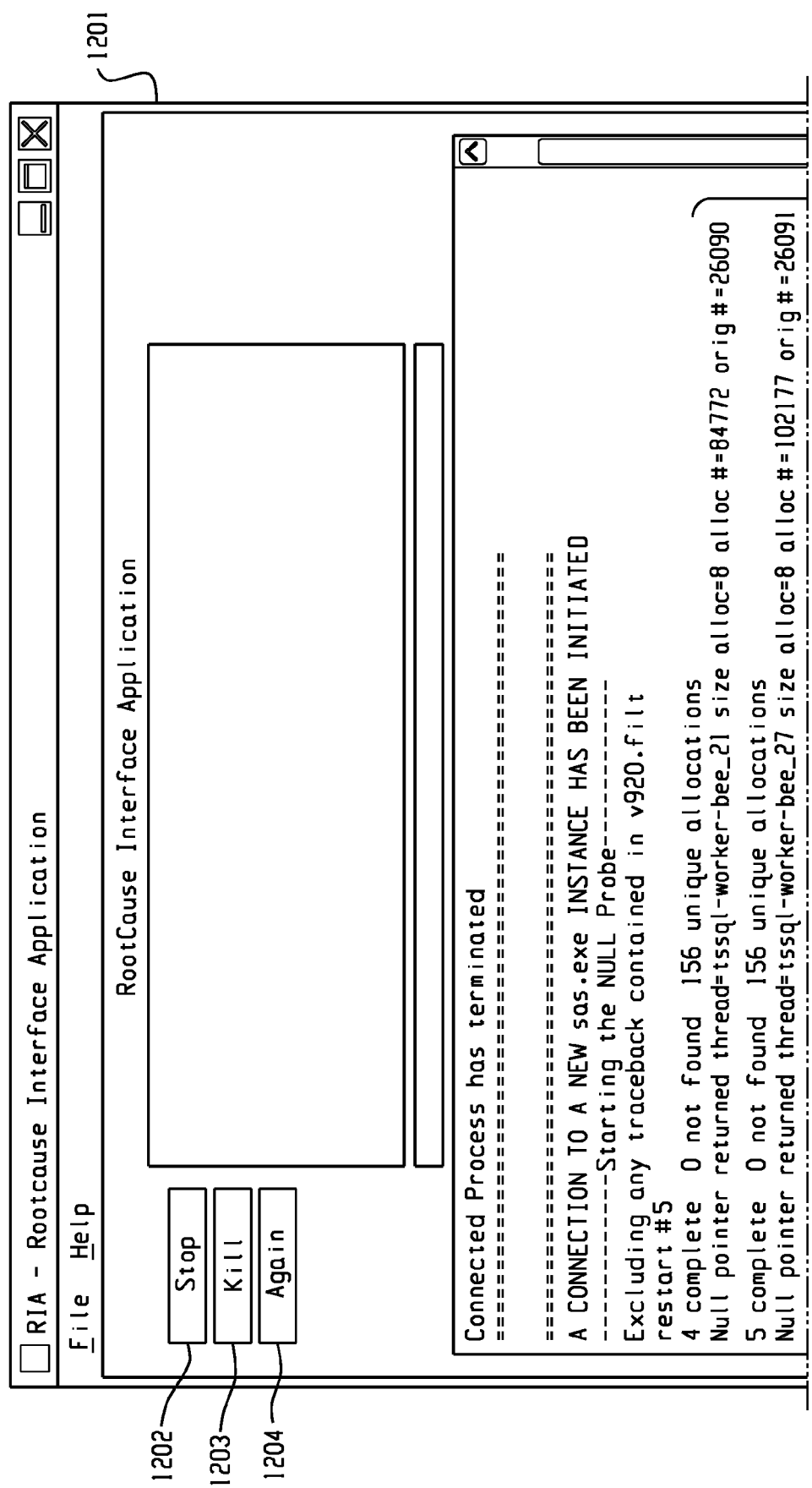

MATCH TO FIG.12A

```
6 complete  0 not found  156 unique allocations
Null pointer returned thread=tssql-worker-bee_33 size alloc=8 alloc #=119577 orig #=26092
7 complete  0 not found  156 unique allocations
Null pointer returned thread=tssql-worker-bee_39 size alloc=8 alloc #=136977 orig #=26093
8 complete  0 not found  156 unique allocations
Null pointer returned thread=tssql-worker-bee_45 size alloc=8 alloc #=154379 orig #=26094
9 complete  0 not found  156 unique allocations
Null pointer returned thread=tssql-worker-bee_51 size alloc=8 alloc #=171782 orig #=26095
10 complete  0 not found  156 unique allocations
Null pointer returned thread=tssql-worker-bee_57 size alloc=4 alloc #=189186 orig #=26096
11 complete  0 not found  156 unique allocations
```

1201

Host - d15002    NUM

Ready

*Fig. 12B*

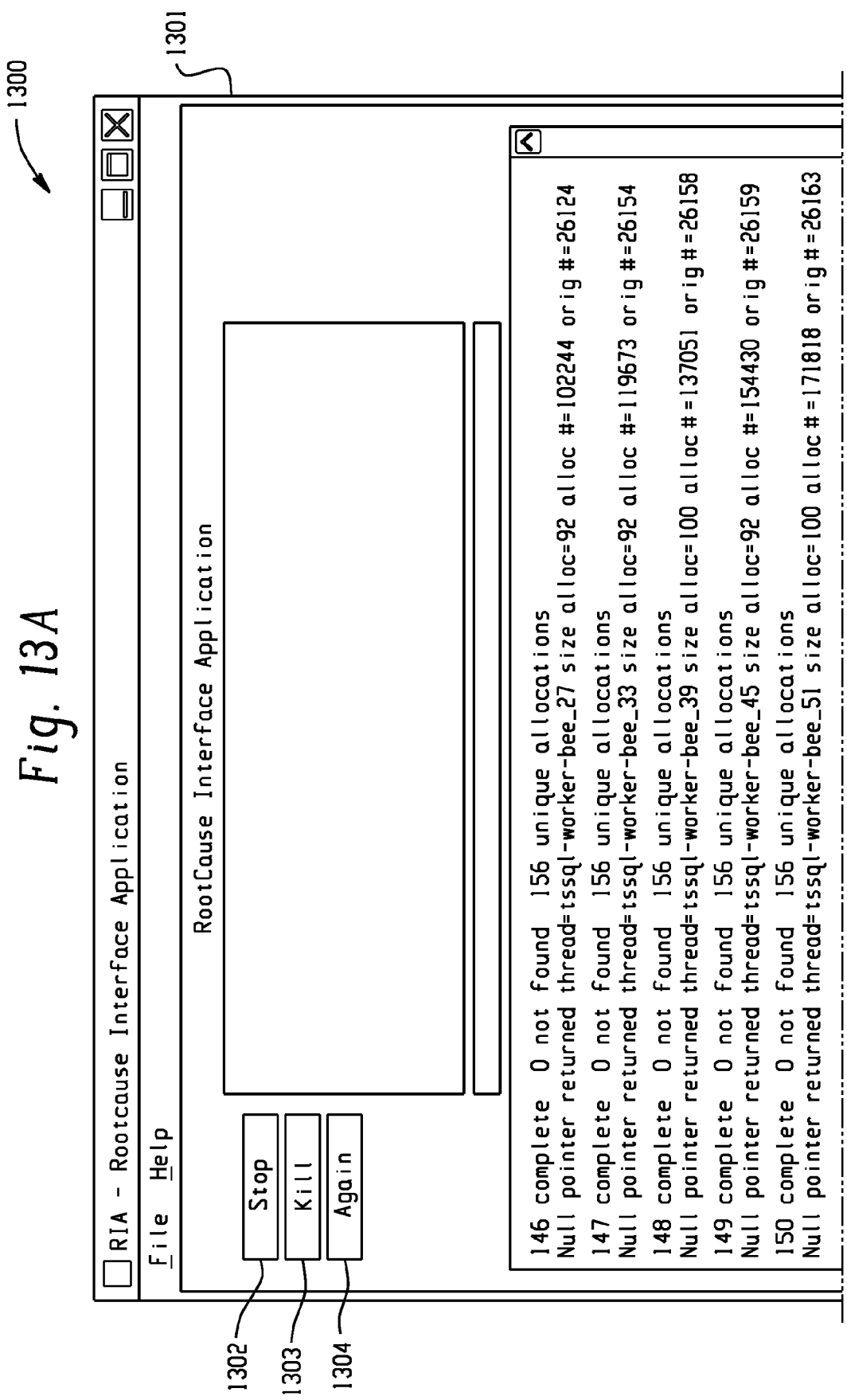

MATCH TO FIG.13A

```
151 complete 0 not found  156 unique allocations
Null pointer returned thread=tssql-worker-bee_57 size alloc=92 alloc #=189208 orig #=26164
152 complete 0 not found  156 unique allocations
Null pointer returned thread=tssql-worker-bee_63 size alloc=100 alloc #=206594 orig #=26170
153 complete 0 not found  156 unique allocations
Null pointer returned thread=tssql-worker-bee_69 size alloc=92 alloc #=223972 orig #=26171
154 complete 0 not found  156 unique allocations
Null pointer returned thread=tssql-worker-bee_75 size alloc=628 alloc #=241350 orig #=26172
155 complete 0 not found  156 unique allocations
Null pointer returned thread=tssql-worker-bee_81 size alloc=92 alloc #=258739 orig #=26186
111
Connected Process has terminated
===================================================
```

1301

Ready          Host - d15002    NUM

Fig. 13B

SYSTEMS AND METHODS FOR AUTOMATED DETERMINATION OF ERROR HANDLING

CROSS-REFERENCE TO RELATED APPLICATIONS

This application is a continuation-in-part of U.S. patent application Ser. No. 12/406,363 filed on Mar. 18, 2009 now U.S. Pat. No. 7,904,754 and entitled "Systems and Methods for Automated Determination of Out of Memory Handling." The entirety of which is herein incorporated by reference.

TECHNICAL FIELD

The present disclosure relates generally to computer-implemented systems and methods for handling computer software and more specifically for debugging computer software.

BACKGROUND

Debugging is a methodical process of finding and reducing the number of bugs, or defects, in a computer program, thus making it behave as expected. As software and electronic systems have become generally more complex, the process of detecting errors in the coding of those systems has become much more difficult. Debugging difficulty is further exacerbated by complicated interactions between a computer program being analyzed and other computer programs and hardware.

SUMMARY

In accordance with the teachings provided herein, systems and methods are provided for automated determination of error handling. Data is received including one or more procedural operations to be tested. A first test may be run on the data to capture one or more first tracebacks, where each traceback is associated with a procedural operation. A determination may be made as to whether each captured first traceback is unique, where unique tracebacks are added to a unique traceback list. An error condition may be simulated on each unique traceback on the unique traceback list by running a second test. The second test may be run once for each unique traceback. One or more second tracebacks may be captured during each run of the second test. When a unique traceback being tested matches a captured second traceback, an error code may be returned and the second test may be run to completion. Errors encountered during each iteration of the second test running to completion may be identified.

As another example, a computer-program product, tangibly embodied in a machine-readable storage medium, may include instructions operable to cause a data processing apparatus to perform a method for automated determination of error handling. In the method, data is received including one or more procedural operations to be tested. A first test may be run on the data to capture one or more first tracebacks, where each traceback is associated with a procedural operation. A determination may be made as to whether each captured first traceback is unique, where unique tracebacks are added to a unique traceback list. An error condition may be simulated on each unique traceback on the unique traceback list by running a second test. The second test may be run once for each unique traceback. One or more second tracebacks may be captured during each run of the second test. When a unique traceback being tested matches a captured second traceback, an error code may be returned and the second test may be run to completion. Errors encountered during each iteration of the second test running to completion may be identified.

As a further example, a system may include one or more processors. The system may include one or more computer-readable storage mediums containing instructions configured to cause the one or more processors to perform operations including performing a method for automated determination of error handling. In the method, data is received including one or more procedural operations to be tested. A first test may be run on the data to capture one or more first tracebacks, where each traceback is associated with a procedural operation. A determination may be made as to whether each captured first traceback is unique, where unique tracebacks are added to a unique traceback list. An error condition may be simulated on each unique traceback on the unique traceback list by running a second test. The second test may be run once for each unique traceback. One or more second tracebacks may be captured during each run of the second test. When a unique traceback being tested matches a captured second traceback, an error code may be returned and the second test may be run to completion. Errors encountered during each iteration of the second test running to completion may be identified.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 10 shows an example display of a test for specific tracebacks.

FIGS. 11A and 11B show an example display of an interface application or RIA window indicating the specific traceback being tested.

FIGS. 12A and 12B show another example display of the interface application window including an incremental count of iterations being tested.

FIGS. 13A and 13B show yet another example display of the interface application window including the last iteration tested.

DETAILED DESCRIPTION

Figure 1:
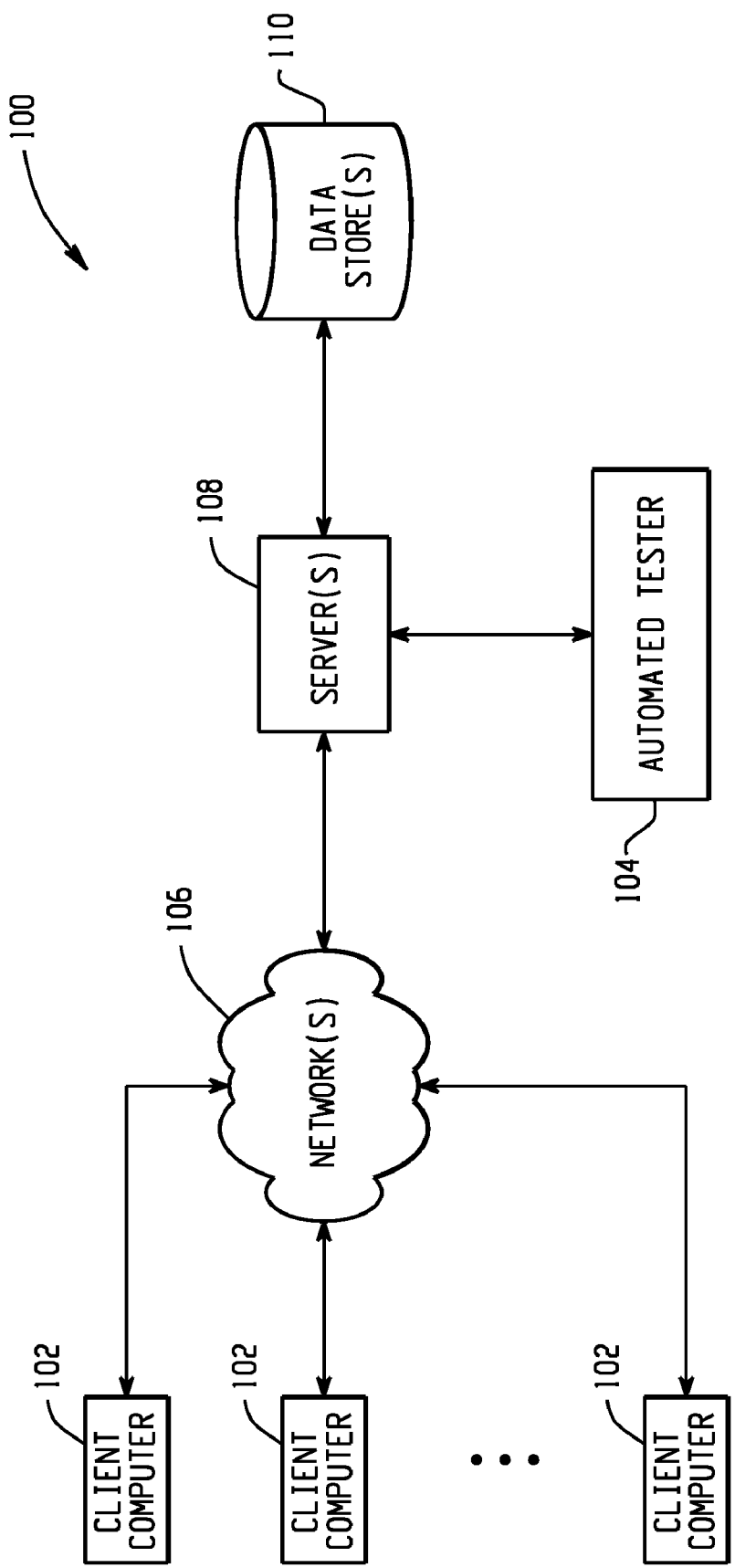
FIG. 1 depicts a computer-implemented environment for automated determination of error handling.

FIG. 1 depicts a computer-implemented environment for automated determination of error handling. A client computer 102 interacts with an automated tester 104 to identify defects (e.g., errors, bugs) encountered when testing an application. The automated tester 104 may test the application for a variety of types of errors.

For example, the automated tester may test an application to determine whether the application is interacting properly with other software applications or hardware. Such interactions are sometimes a challenge to debug. To test all possible scenarios that the application may encounter, a debugger (e.g., automated debugging program, software engineer) must not only control the application being tested but must also have sufficient control of the interacting software applications or hardware (e.g., to generate a multitude of scenarios).

As an alternative to having actual control of the software applications or hardware that interact with an application being tested, control can be simulated by the automated tester 104. For example, to test the error handling capability of an application being tested, the automated tester 104 can simulate certain interactions with other software applications or hardware such that it appears to the application being tested that an error has occurred at the other software applications or hardware. The automated tester 104 can then monitor the operation of the application being tested after the error is simulated to determine whether the application being tested handles the error condition properly. For example, the automated tester 104 can monitor the application being tested to determine if the error condition causes the application being tested to crash or lock up. Additionally, the automated tester 104 can determine if the application being tested is able to handle the error condition properly and continue operation.

Any number of error conditions at software applications or hardware interacting with an application to be tested can be simulated. For example, the automated tester 104 may simulate an out of memory condition at a memory allocation within the application being tested. In such a scenario, upon a request for a memory allocation or pool heap allocation (e.g., by the application being tested), instead of returning an address of the memory or pool heap allocated, the automated tester 104 can return a null value to the application being tested in response to the allocation request. The return of a null value to the application being tested can signal that the memory interacting with the application being tested is out of memory and cannot fulfill the request. The automated tester 104 can then monitor the application being tested to determine whether the application handles the error condition properly or whether the error condition causes a crash, a lock up, or another improper condition at the application being tested.

Many other error conditions can be simulated as well. For example, the automated tester 104 may simulate an error with an input/output (I/O) device interacting with the application being tested. As another example, the automated tester 104 may simulate an error (e.g., a TCP error) with a network or network device interacting with the application being tested. In addition to hardware, the automated tester 104 may also simulate errors with other software applications interacting with the application being tested.

The client computers 102 can interact with the automated tester 104 in a number of ways, such as over one or more networks 106. For example, server(s) 108 accessible through the network(s) 106 can host the automated tester 104. One or more data stores 110 can store the data to be analyzed by the automated tester 104 as well as any intermediate or final data generated by the automated tester 104. The one or more data stores 110 may contain many different types of data associated with the process including the application to be tested, the error conditions to be simulated, as well as other data. The automated tester 104 can be an integrated web-based reporting and analysis tool that provides users flexibility and functionality for testing a software application. It should be understood that the automated tester 104 could also be provided on a stand-alone computer for access by a client computer 102. It should also be understood that the automated tester 104 may be utilized with hardware implementations of software such as field-programmable gate arrays.

Figure 2:
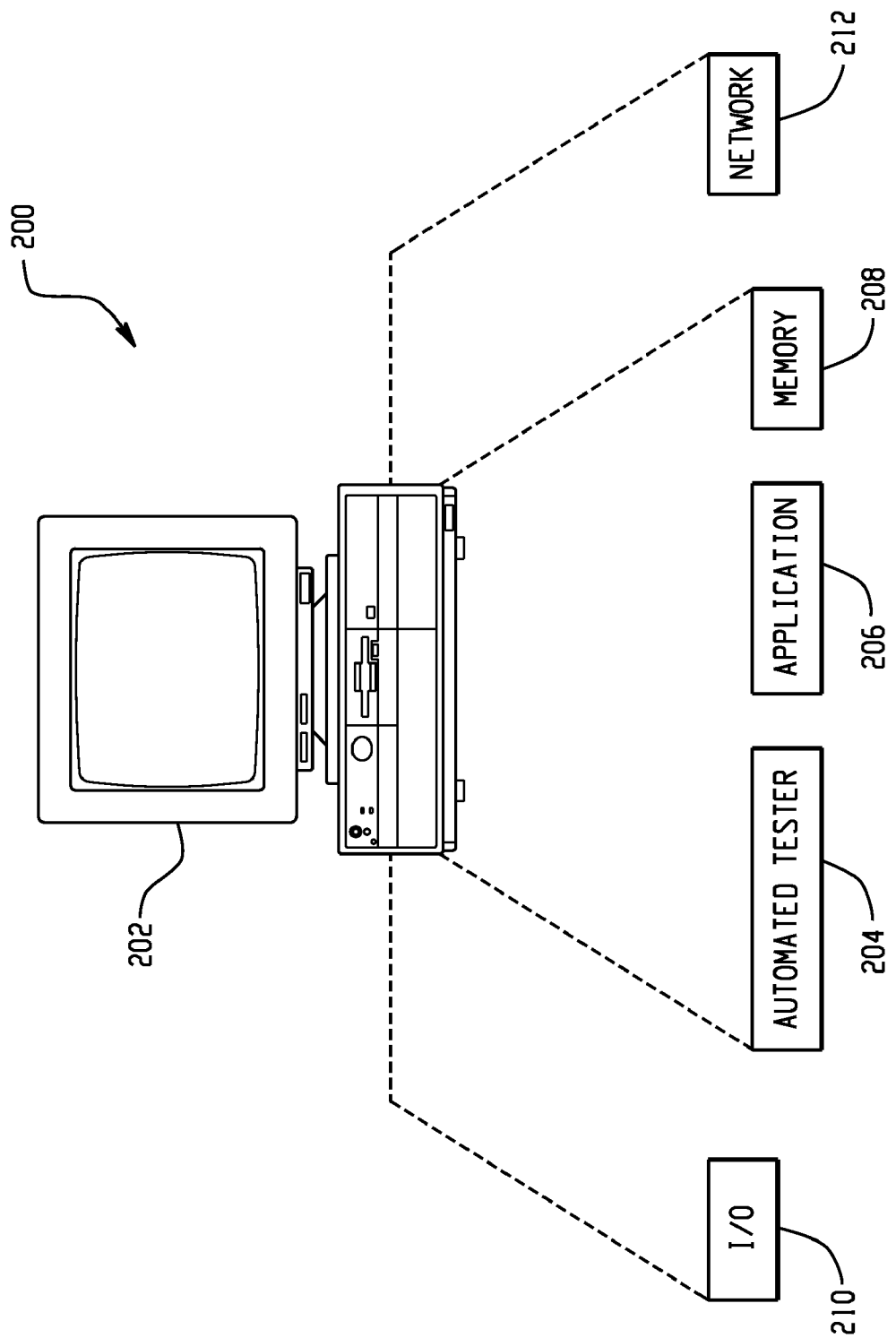
FIG. 2 shows a block diagram of another example system for automatically determining the effectiveness of the error handling of an application being tested.

FIG. 2 shows a block diagram of another example system 200 for automatically determining the effectiveness of the error handling of an application being tested. A user can interact with the system 200 using a stand-alone computer 202 including an automated tester 204 and an application to be tested 206. The stand-alone computer 202 can also include any other software applications interacting with the application being tested, as well as hardware, such as a memory 208, an I/O device 210, or a network 212.

Figure 3:
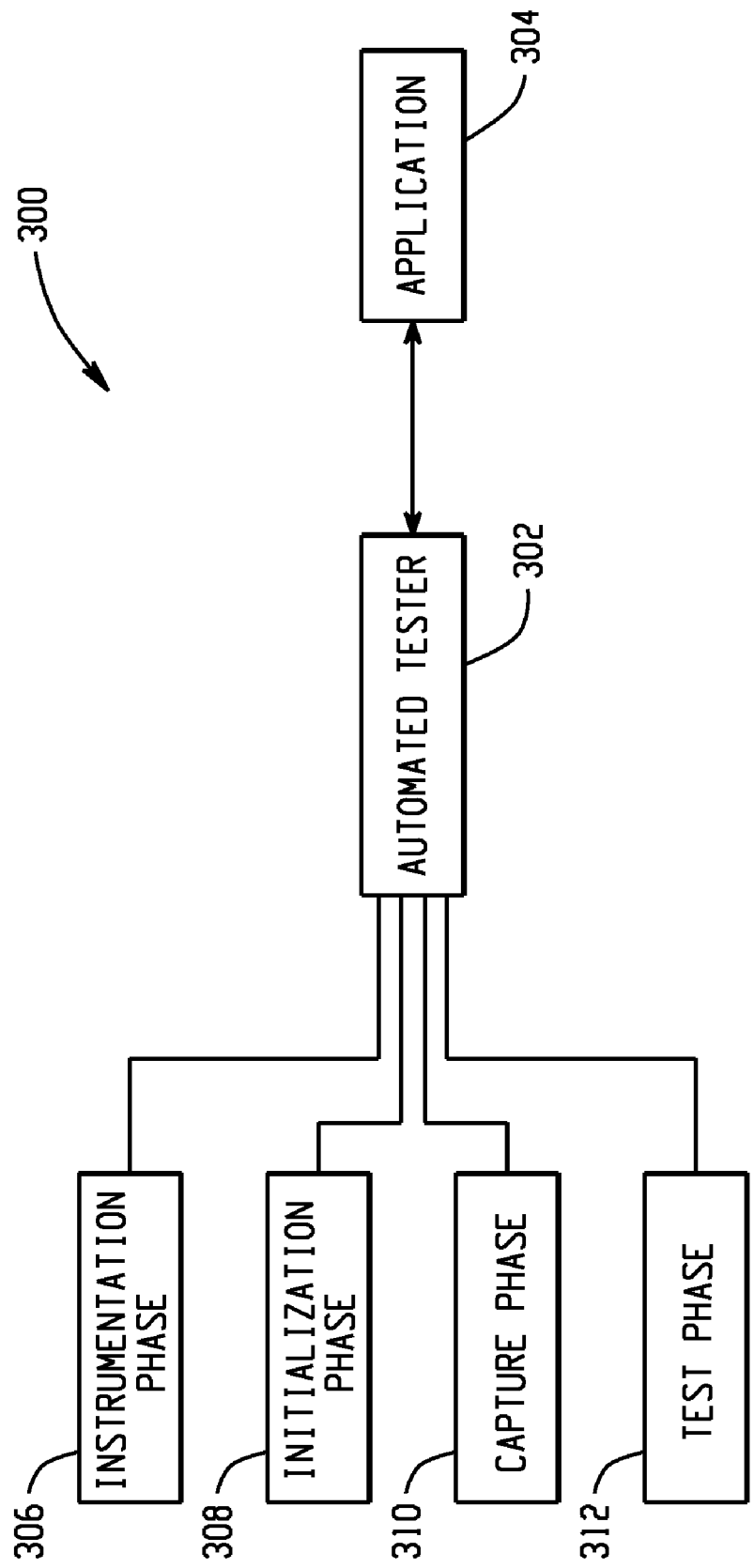
FIG. 3 depicts a system for testing the error handling of an application.

FIG. 3 depicts a system for testing the error handling of an application. In the system 300, an automated tester 302 can check certain procedural operations of interest by the application 304 in order to determine whether the application 304 handles error conditions for those procedures properly. If the application improperly handles an error that occurs during the check, the automated tester 302 provides detection of the situation and reason(s) for why the situation occurred.

To provide detection and analysis of the handling of error situations for the application 304, the automated tester 302 can be implemented in several phases, such as an instrumentation phase 306, an initialization phase 308, a capture phase 310, and a test phase 312. An instrumentation phase 306 can insert code into the application 304, such that application 304 is configured to capture every procedural operation being tested (e.g., memory allocations, I/O operations, network communications). After the application 304 is instrumented, the automated tester 302 can begin the initialization phase 308. During the initialization phase 308, the automated tester 302 can prime the system and perform any initialization needed (e.g., as required by a particular application being processed).

After the initialization phase 308, the automated tester 302 can signal the application 304 to begin the capture phase 310. During the capture phase 310, the application being tested is executed once, and the application 304 captures one or more lines of code (e.g., a traceback), from each procedural operation being tested and encountered during the run of the application. For example, a traceback can be one or more lines of code that can provide debugging information for the system 300 using execution history data about program problems (e.g., a crash or a lock up). In some implementations, during the capture phase 310, the application 304 can capture a traceback including ten lines of code. In other implementations, during the capture phase 310, the application 304 can capture a traceback including more than ten lines of code or a traceback including less than ten lines of code.

In some configurations, upon completion of the capture phase 310, the system can compare the captured tracebacks associated with the procedural operation(s) of interest being tested, and the system can save any unique tracebacks. In some implementations, a filter (not shown) can be used to filter out or remove one or more tracebacks (e.g., tracebacks that have already been tested or tracebacks with known crashes). In other implementations, all captured tracebacks may be retained despite their uniqueness. The number of unique tracebacks can be set as a count. The count identifies the number of procedural operations to be tested in the test phase 312. For example, one procedural operation can be associated with each unique traceback on the unique traceback list Upon completion of the capture phase 310, the system initiates the test phase 312 to simulate an error. Errors can include an error in the application being tested, an error in the software interacting with the application being tested, or an error in the hardware. During the test phase 312 the automated tester 302 can re-submit the test a number of times that is equivalent to the count that was set during the capture phase 310.

During the test phase 312, the instrumented application 304 can test a specific unique traceback by running the application, capturing one or more additional tracebacks, and comparing captured tracebacks obtained during the present or current run of the application with the specific unique traceback being tested during that run of the application. For example, when the tracebacks match, a procedural operation to be tested has been located. An error code associated with that procedural operation can be returned to the application being tested to simulate an error condition (e.g., a null pointer is returned from a memory allocation or pool creation routine to simulate an out of memory condition). Upon receiving an error code, the instrumented application 304 can allow the rest of the current iteration of the test to execute. In these implementations, while the rest of the iteration of the test is executing, additional tracebacks are not checked for matches to the unique traceback list.

Additionally, while the rest of the iteration of the test is executing, the application 304 can monitor and capture test results. For example, when the iteration of the test causes the application 304 to crash, a traceback of the crash, can be captured and saved in a file along with the traceback of the last allocation where a null pointer was returned (e.g., the traceback currently being tested). In this example, the application 304 can write remaining untested unique tracebacks (e.g., unique tracebacks in the count which have not been tested) to a file, and then the application 304 can terminate (e.g., using a "crash" code). The test phase 312 can include other types of error handling analysis as described below with respect to example operational scenarios.

The test results can be reported and can include information about any crashes and lock ups that occurred during the test phase 312. The test results can be saved to memory, saved to disk (not shown), printed, or otherwise made available for review. Reports can be useful to verify that all instances of procedural operations to be tested in the system have been checked. Reports can also provide reasons why an application failed to handle an error condition properly.

The capture phase 310 can be referred to as a first running of a test, and the multiple iterations of the test phase 312 can be referred to as subsequent iterations of the test. The capture phase 310 can also be referred to as a first test and the multiple iterations of the test phase 312 can be referred to as iterations of a second test.

Figure 4A:
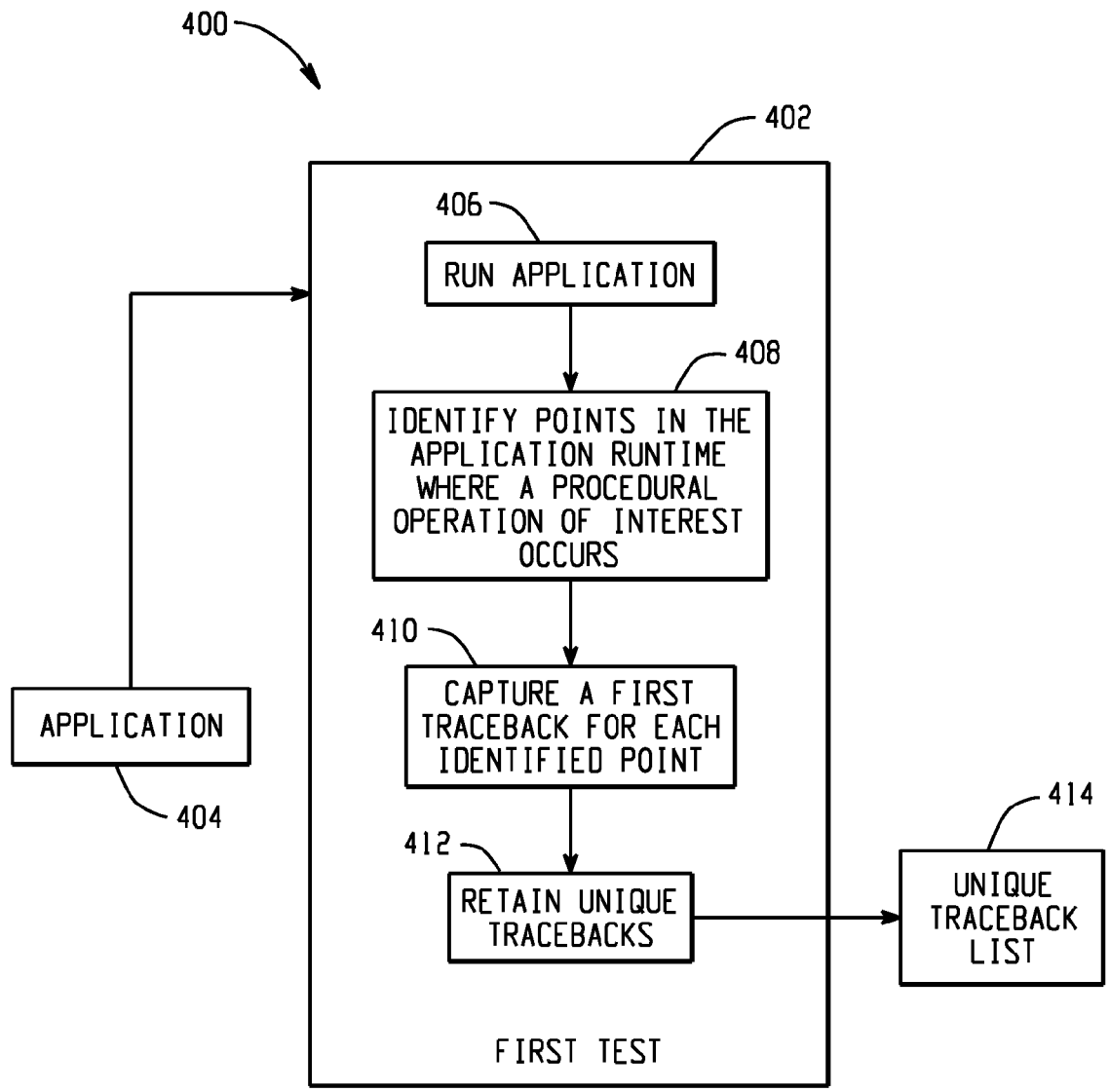
FIGS. 4A and 4B are block diagrams depicting the analysis of error handling for an application using the first test, second test nomenclature.
Figure 4B:
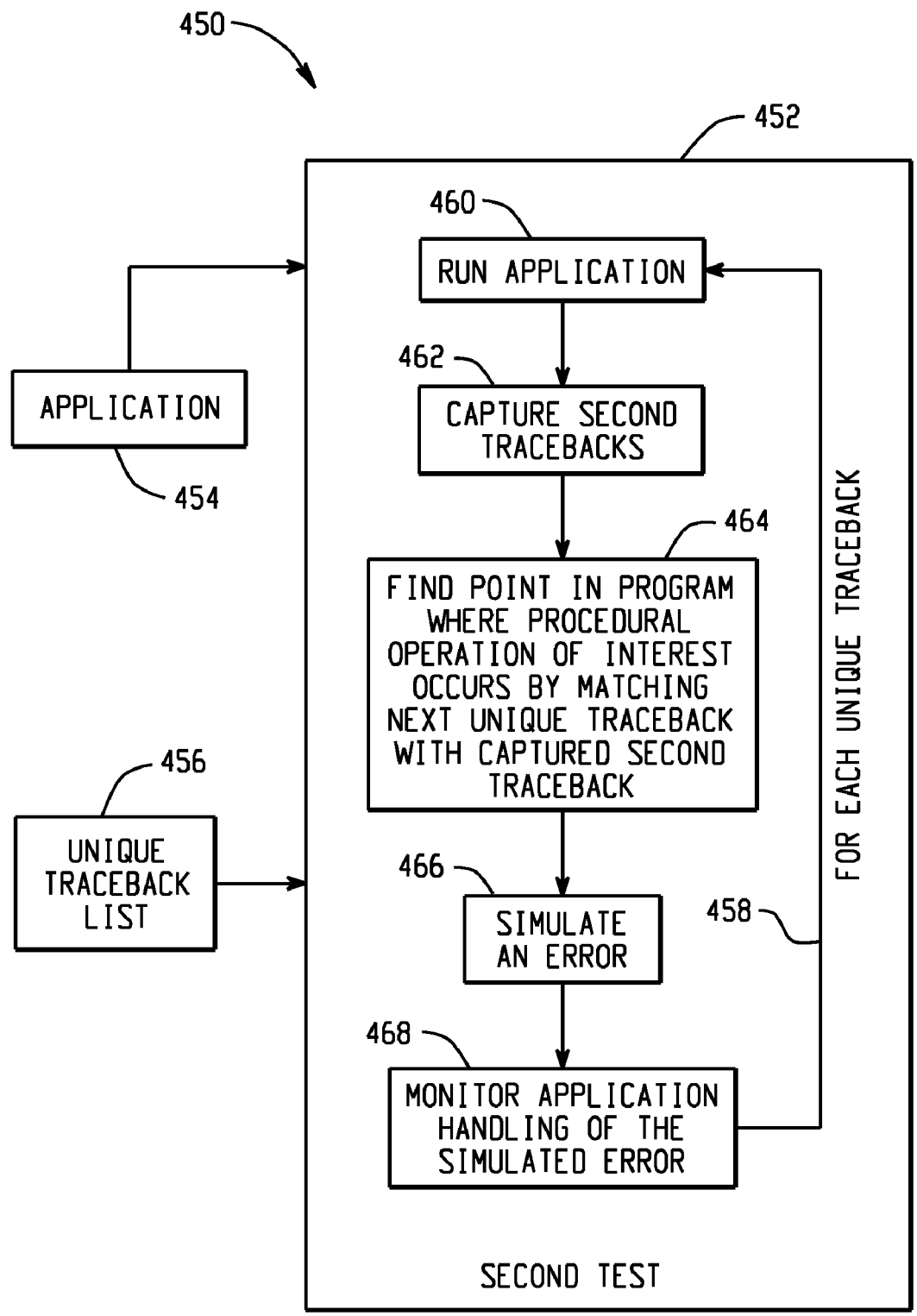

FIGS. 4A and 4B are block diagrams depicting the analysis of error handling for an application using the first test, second test nomenclature. FIG. 4A depicts the first test 402 being run on an application 404. During the first test 402, the application is run at 406, and procedural operations of interest are identified at 408. For example, if the procedural operations of interest are memory allocations, then at 408, each memory or pool heap allocation by the application 404 may be identified. At each identified point, a first traceback is captured at 410. Some filtering of the captured first tracebacks may then be performed. For example, captured first tracebacks may be compared and filtered such that only unique tracebacks are retained at 412 in a unique traceback list 414. Such filtering to retain only unique tracebacks can reduce the number of iterations of the second test by testing a single unique operation associated with multiple captured tracebacks only one time.

FIG. 4B depicts the second test 452 being run on the application 454. During the second test 452, an error condition is simulated on each unique traceback on the unique traceback list 456, where the second test 452 is run once for each unique traceback on the unique traceback list, as indicated by the loop at 458. For each iteration of the second test, the application being tested is run at 460. During the run of the application, second tracebacks are captured at 462. The captured second tracebacks are compared at 464 to a unique traceback being tested from the unique traceback list 456. When a captured second traceback matches the unique traceback being tested, the second test 452 knows that it has reached a procedural operation to be tested. At 466, the second test simulates an error, and at 468, the second test 452 monitors the subsequent execution of the application 454 to determine if the application 454 handles the error condition properly or not. After an iteration of the second test 452 is completed, the unique traceback being tested may be removed from the unique traceback list 456, and the second test 452 may be repeated for the next unique traceback on the unique traceback list 456.

Figure 5:
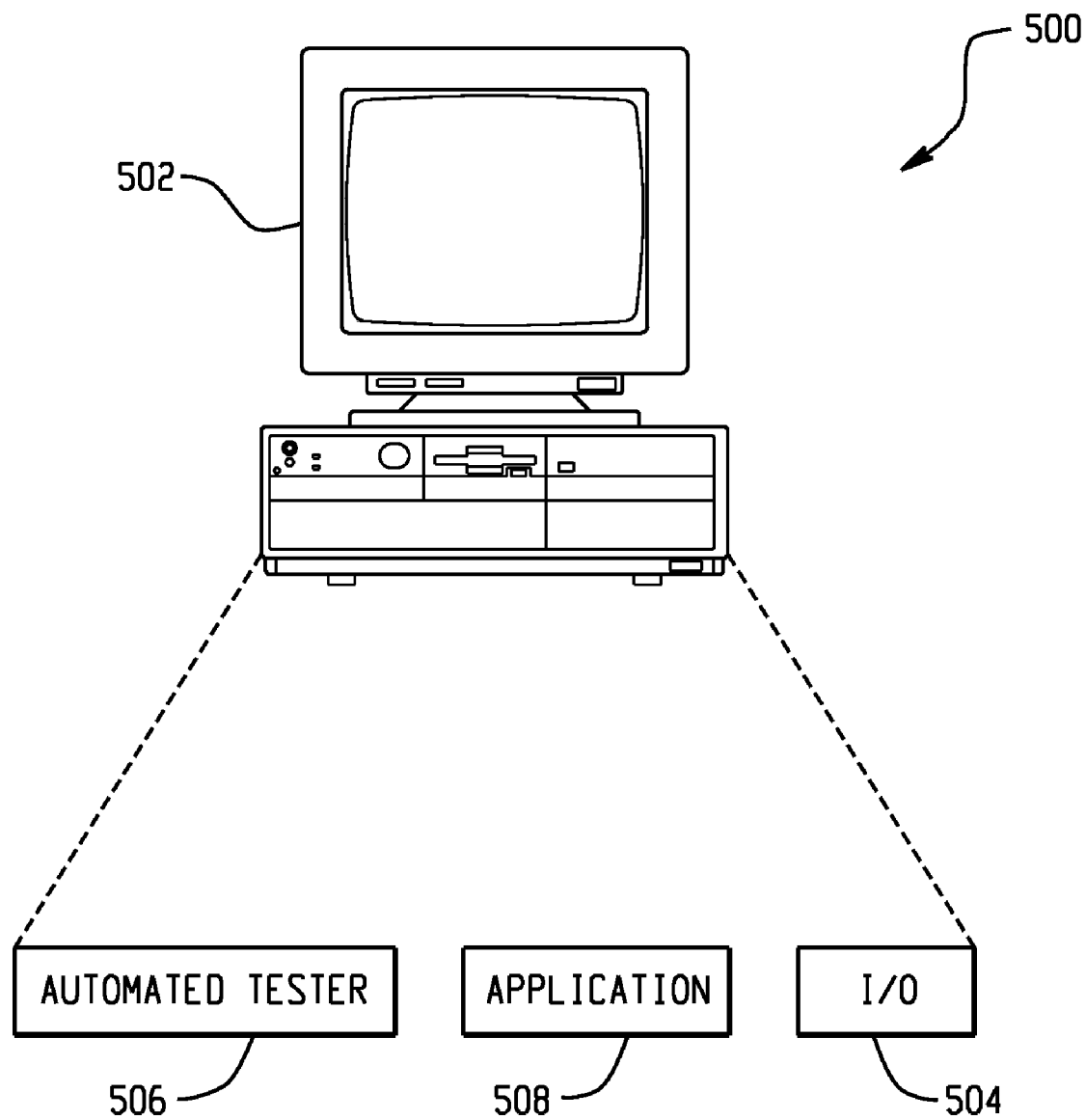
FIG. 5 shows a block diagram of an example system for automatically determining error handling of I/O errors.

FIG. 5 shows a block diagram of an example system for automatically determining error handling of I/O errors. A user can interact with the system 500 using a stand-alone computer 502 including an Input/Output Device 504, an automated tester 506, and an instrumented application 508.

Figure 6:
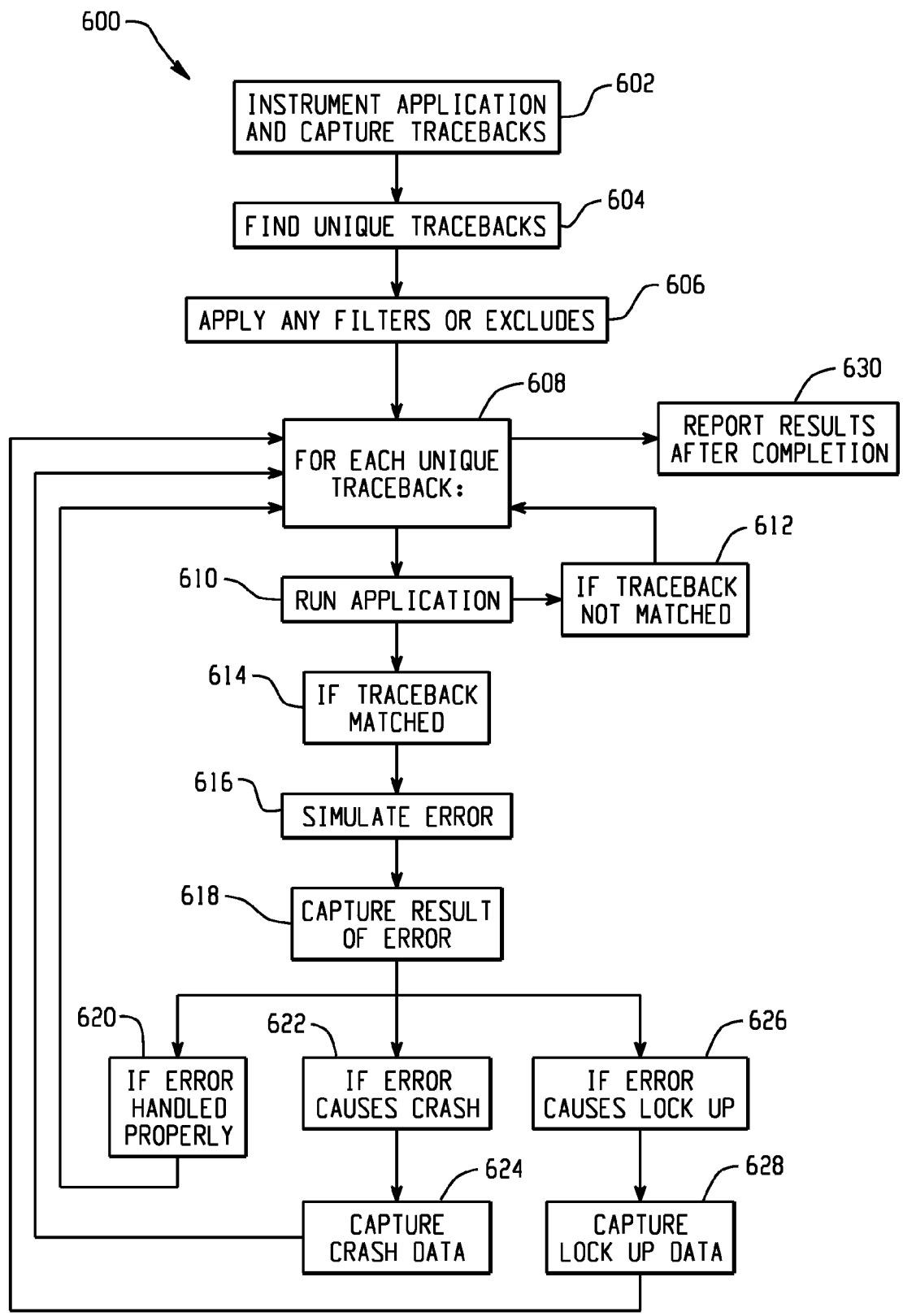
FIG. 6 is a flow diagram depicting an example method of analyzing the I/O error handling of an application.

FIG. 6 is a flow diagram depicting an example method of analyzing the I/O error handling of an application. At 602 the application being tested is instrumented, and first tracebacks are captured during a first execution of the application to be tested. For example, every I/O operation at the operating system may be instrumented. Simulating errors at the operating system level provides an accurate simulation of many real world errors that the application being tested might encounter. For example, I/O operations that may be instrumented include file open, read, write, seek (setfilepointer), delete file, and rename file. During capture, I/O operations are captured with a set of lines of traceback (e.g., 30 lines). At 602, the set of captured first tracebacks is reviewed, and unique tracebacks are retained, resulting in a count (CNT) number of unique tracebacks (e.g., represented by a unique traceback list). Additional filters may be applied at 606. For example, already tested tracebacks and tracebacks associated with known error handling crashes may be excluded from the unique traceback list.

At 608, a loop is performed CNT times (e.g., once for each traceback on the unique traceback list. The application to be tested is run at 610. Second tracebacks, captured during a run of the application at 610, are compared to a unique traceback on the unique traceback list. An I/O operation to be tested is found when a unique traceback on the unique traceback list is matched with a captured second traceback. If such a match is not made at 612, then processing can move to the next unique traceback on the unique traceback list at 608. If a traceback is matched at 614 then an error code can be returned at 616 to simulate an I/O error. For example, a windows SetLastError( ) function may be set so that the application being tested can attempt to handle the error using the GetLastError( ) function.

At 618, the automated tester can capture the result of the simulated error (e.g., by allowing the application being tested to continue processing). If the application being tested handles the error properly (e.g., the application provides an error message and allows the system to recover properly) at 620, then processing returns to 608 for the next unique traceback on the unique traceback list. If the error causes the application being tested to crash at 622, then application crash data can be captured at 624. Application crash data 624 can include a notation of the unique traceback being tested and a traceback proximate to the crash. Processing can then return to 608 for the next unique traceback on the unique traceback list, and the application can be run again at 610 for a next unique traceback. If the error causes the application being tested to lock up at 626, then application lock up data can be captured at 628. Application lock up data 628 can include a notation of the unique traceback being tested. Processing then returns to 608 for the next unique traceback on the unique traceback list, and the application can be run again at 610 for a next unique traceback. Upon testing of all the unique tracebacks on the unique traceback list, a report of the results can be returned at 630.

Figure 7:
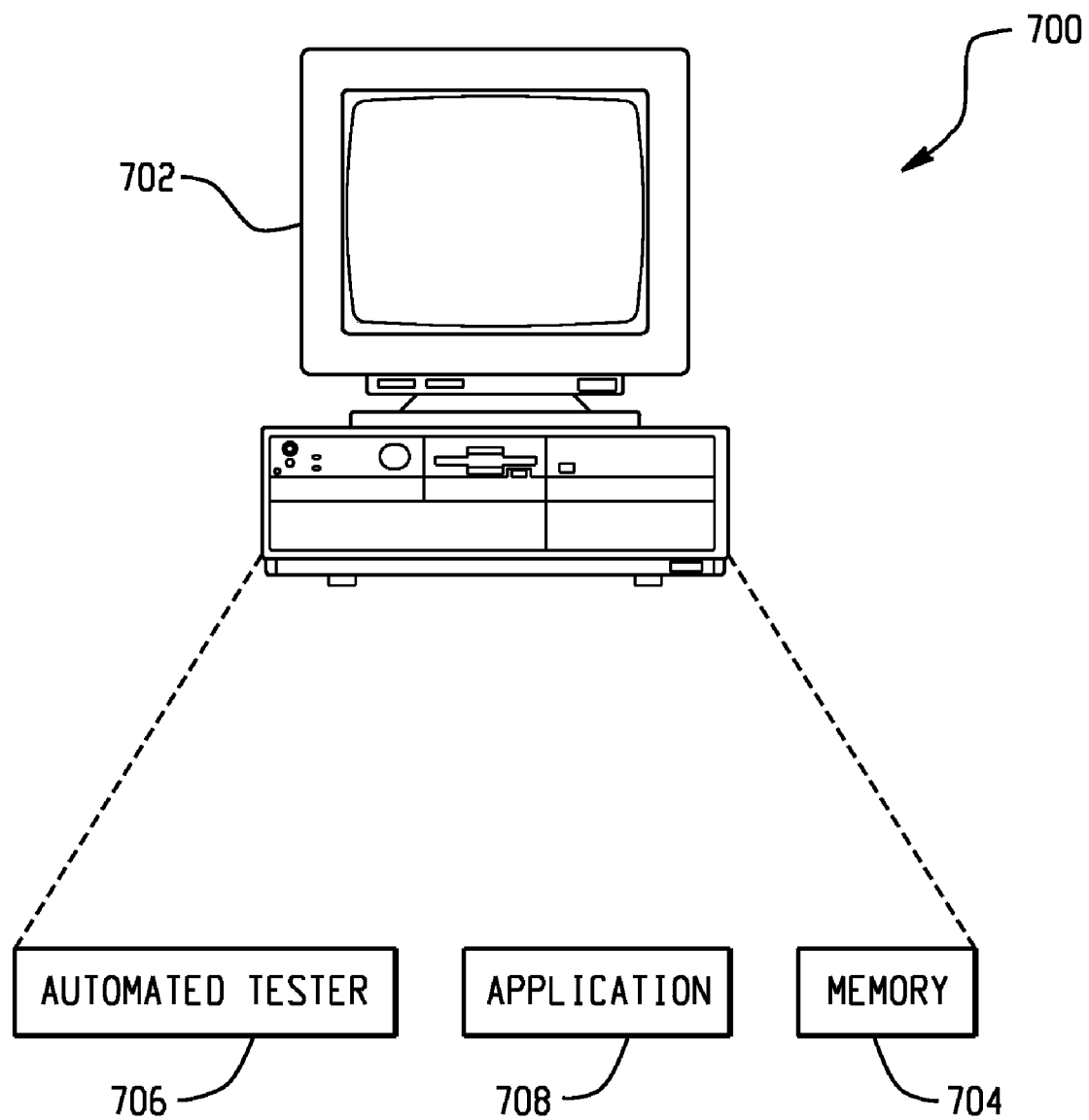
FIG. 7 shows a block diagram of an example system for automatically determining out of memory situations.

FIG. 7 shows a block diagram of an example system for automatically determining out of memory situations. In system 700, a user can interact with the system 700 using a stand-alone computer 702 including a memory 704, an automated tester 706, and an instrumented application 708.

Memory utilization demands within computer systems have increased dramatically as a result of attempting to satisfy computer resource consumption needs of their users. Memory utilization demands cause problems within the computer systems, such as out of memory situations. For example, out of memory situations can occur in complex computer systems that handle numerous users. When an out of memory situation occurs, a computer system can react in different and often unpredictable ways. In some instances, the computer system may be able to repair itself and continue operations, but in other instances, an out of memory situation can cause a computer system to crash.

Instances of memory allocation can be checked by limiting the amount of memory available in a computer system and monitoring how the computer system reacts. However, handling memory allocations in this way often results in only a limited number of memory allocation scenarios being checked within the computer system. Accordingly, many instances of memory allocation in the computer system can go unchecked. Additionally, the reasons why a computer system ran out of memory and where a computer system runs out of memory can remain uncertain.

Figure 8:
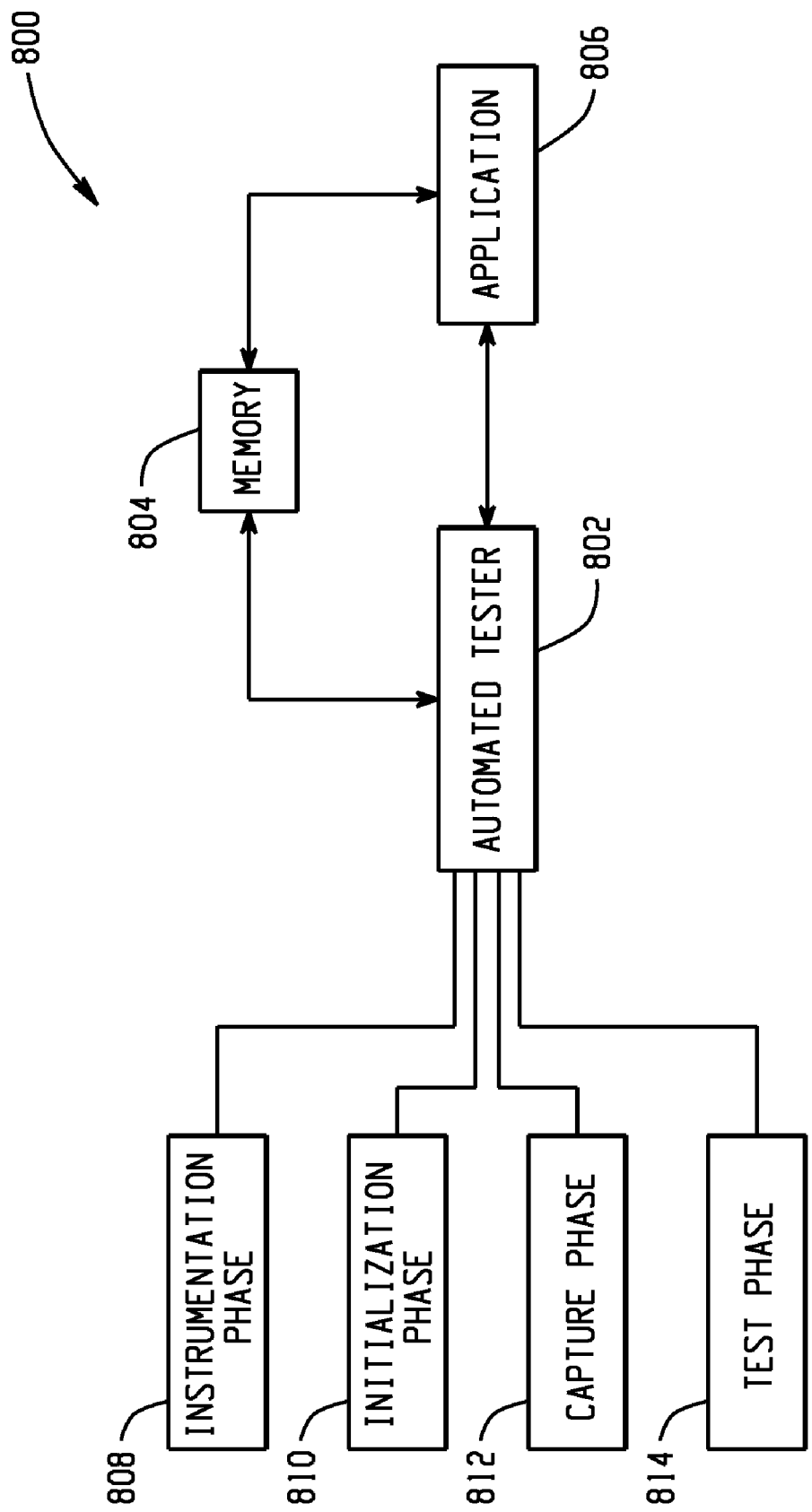
FIG. 8 depicts a system for testing an application for out of memory handling situations.

FIG. 8 depicts a system for testing an application for out of memory handling situations. In the system 800, an automated tester 802 checks allocations of memory 804 by the application in order to determine whether the application 806 handles out of memory situations correctly. If an out of memory situation occurs during the check, the automated tester 802 can provide detection of the situation and reason(s) why the situation occurred.

To provide detection and analysis of out of memory situations for the application, the automated tester 802 can be implemented in several phases, such as an instrumentation phase 808, initialization phase 810, a capture phase 812, and a test phase 814. An instrumentation phase 808 can insert code into the application 806, such that application 806 is configured to capture every allocation and pool create in system 800. After application 806 is instrumented, the automated tester 802 can begin the initialization phase 810. During the initialization phase 810, the automated tester 802 can prime the system and perform any initialization needed (e.g., as required by a particular application being processed).

After the initialization phase 810, the automated tester 802 can signal the application 806 to begin the capture phase 812. During the capture phase 812, the application 806 can capture one or more lines of code (e.g., a traceback), from each allocation and pool create in the system 800. In some implementations, during the capture phase 812 the application 806 can capture a traceback comprising ten lines of code. In other implementations, during the capture phase 812, the application 806 can capture more than ten lines of code or less than ten lines of code.

Upon completion of the capture phase 812, the system can compare the captured tracebacks, and the system can save the unique tracebacks (e.g., in memory 804). In some implementations, unique tracebacks can be determined automatically by the system. In some implementations, the number of unique tracebacks can be set as a count. In other implementations, a filter (not shown) can be used to filter out or remove one or more tracebacks from the count (e.g., tracebacks that have already been tested or tracebacks with known crashes).

Upon completion of the capture phase 812, the system initiates the test phase 814 to simulate an out of memory condition. During the test phase 814 the automated tester 802 can re-submit the test a number of times that is equivalent to the count that was set during the capture phase 812. Additionally, the automated tester 802 can signal the application 806 regarding which instances of the unique tracebacks will be tested. During the test phase 814, in some implementations, the test can be restarted at least a number of times equivalent to the count. In some implementations the test can be restarted a number of times that is greater than the count. In some implementations the test can be restarted a number of times that is less than the count. Each time the test is restarted one or more additional (second) tracebacks can be captured. If a second traceback matching the unique traceback being tested is not found during the additional run of the test, then the system can be stopped and then restarted so that the test for that iteration can be tried again. In some implementations, each restart of the test can be a new iteration of the test.

During the test phase 814, the application 806 can compare each captured (second) traceback with a specific unique traceback. In some implementations, when the tracebacks match, a null pointer (e.g., from the memory allocation or pool creation routine), can be returned. Upon receiving a null pointer, the instrumented application 806 can allow the rest of the current iteration of the test execute. In these implementations, while the rest of the iteration of the test is executing, additional tracebacks are not checked.

Additionally, while the rest of the iteration of the test is executing, the application 806 can monitor and capture test results. For example, when the iteration of the test causes the application 806 to crash, a traceback of the crash (e.g., the current traceback), can be captured and saved in a file along with the traceback of the last allocation where a null pointer was returned (e.g., an exception traceback). In this example, the application 806 can write remaining untested unique tracebacks (e.g., unique tracebacks in the count which have not been tested), to a file and then the application 806 can terminate (e.g., using a "crash" code). The test phase 814 can include other types of out of memory analysis as described below with respect to example operational scenarios.

The test results can be reported and can include information about any crashes and lock ups that occurred during the test phase 814. The test results can be saved to memory 804, saved to disc (not shown), printed, or otherwise made available for review. Reports can be useful to verify that all instances of memory allocation in the system have been checked. Reports can also provide reasons why an application ran out of memory and where the application ran out of memory. Additionally, reports can facilitate a determination regarding how the system will react to an out of memory situation before the occurrence of an out of memory situation.

Figure 9A:
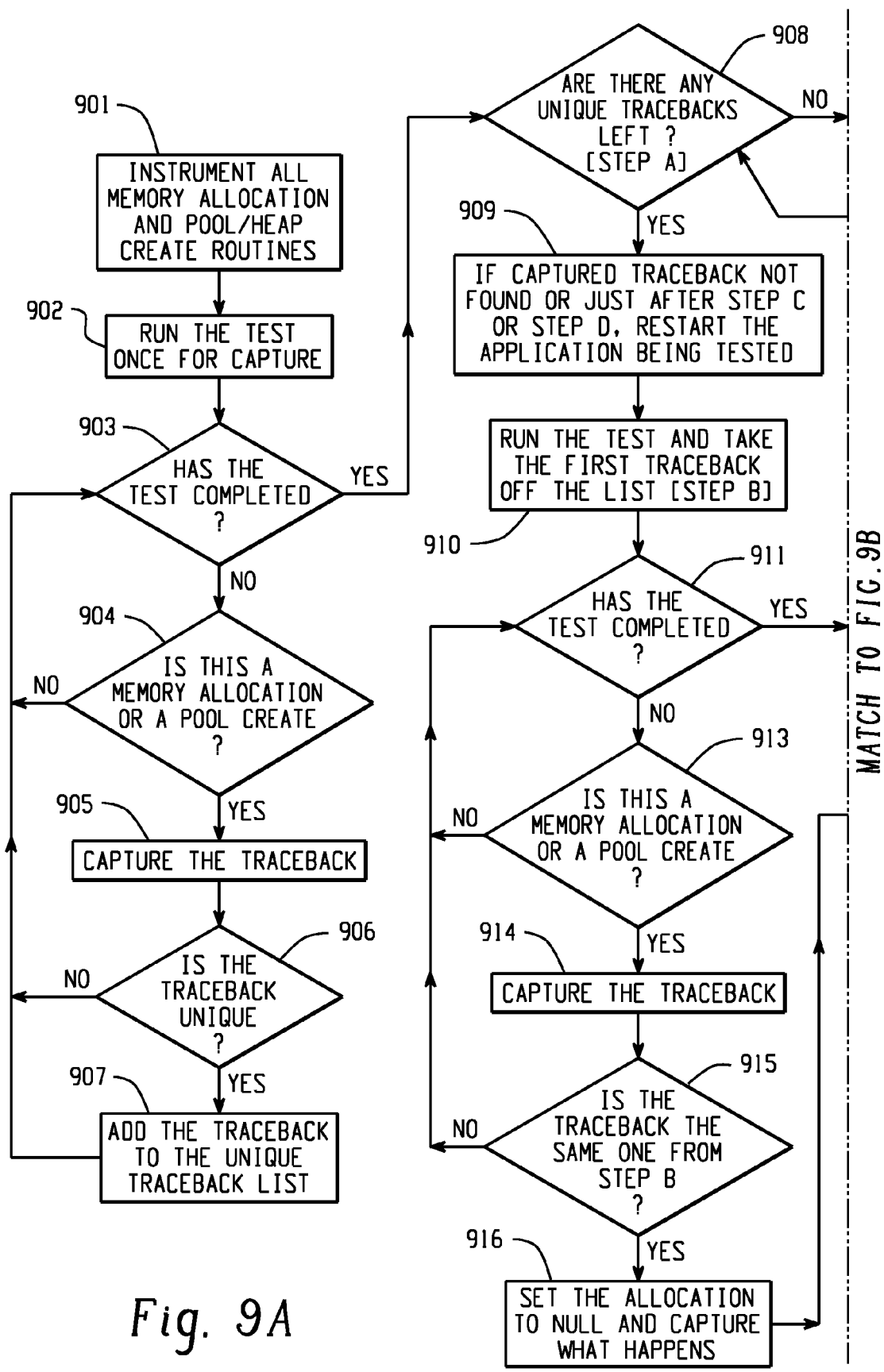
FIGS. 9A and 9B provide an example of an operational scenario of an automated tester for automatically determining out of memory situations.
Figure 9B:
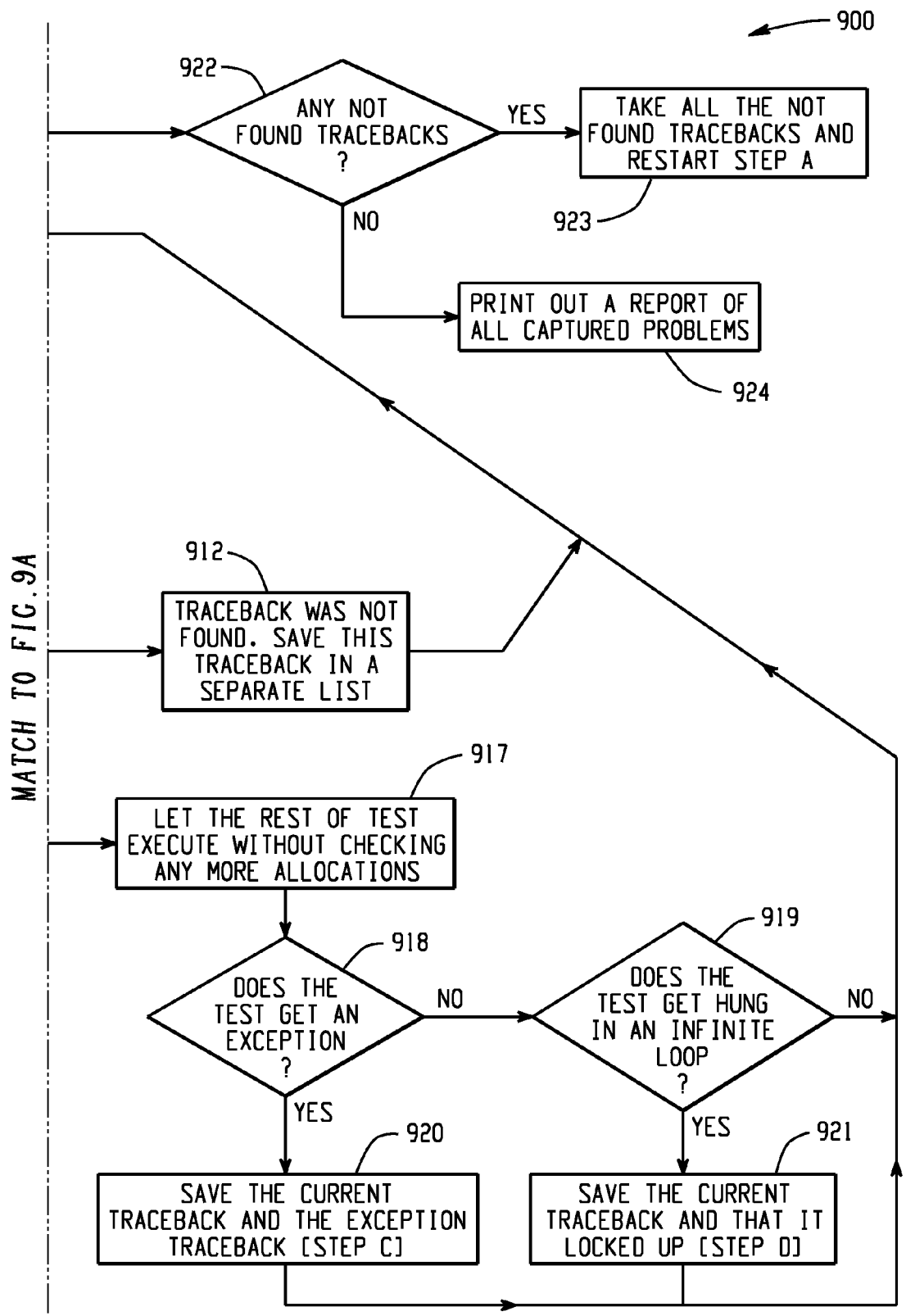

FIG. 9 provides an example of an operational scenario of an automated tester for automatically determining out of memory situations. Method 900 can begin with the instrumenting 901 of all memory allocation and pool/heap create routines. A first iteration of the test can then be run 902 to capture a traceback from each allocation and pool create in the system. During the first iteration of the test, a determination can be made as to whether the first iteration of the test has been completed 903.

If the first iteration of the test has not been completed, the application can continue to determine if additional memory allocations or pool creates 904 exist which need to be tested. If no additional memory allocations or pool creates 904 exist which need to be tested, then a determination can be made again as to whether the first iteration of the test has been completed 903. If additional memory allocations (or pool creates) 904 exist which need to be tested, the application can capture a traceback 905 for each remaining memory allocation and pool create 904 that needs to be tested. Additionally, the application can determine whether each captured traceback is unique 906, as described above. If the application does not determine that a captured traceback is unique 906, the application can continue to determine if additional memory allocations (or pool creates) 904 exist which need to be tested. If the application determines that a captured traceback is unique 906, the application can add that traceback to a unique traceback list (e.g., the count) 907, and then the application can continue to determine if additional memory allocations (or pool creates) exist that need to be tested.

If the first iteration of the test has been completed, the application can determine whether any unique tracebacks exist (e.g., on the list) which need to be tested 908 (e.g., Step A). If a unique traceback on the list needs to be tested 908, the application can run a next iteration of the test to compare each captured traceback 905 (e.g., captured during the run of the next iteration of the test) with a unique traceback 906. If no captured traceback 905 is found to match the unique traceback 906 being tested, the application can save the unique traceback 906 (e.g., on another list 912), and the application can be restarted 909. Once restarted, the application can subsequently proceed to run a next iteration of the test 910 using the first traceback on the unique traceback list 907 (e.g., Step B). When the next iteration of the test 910 is run using the first traceback on the unique traceback list, the first trackback can be taken off the unique traceback list 910 (e.g., thus reducing the count by one).

After the next (or now "current") iteration of the test is run 910, the application can determine if the current iteration of the test ran to completion 911. If the current iteration of the test has run to completion, the application can determine whether a captured traceback 905 was found. As noted above, if no captured traceback 905 is found to match the unique traceback 906 being tested during the next iteration, the application can save the unique traceback 906 (e.g., on another list 912), and the application can be restarted 909. Once restarted, the application can subsequently proceed to run a next iteration of the test using the next traceback on the unique traceback list 910 (e.g., Step B).

If the current iteration of the test has not run to completion, the application can determine whether a memory allocation (or pool create) exists for which a traceback was not captured 913. If no memory allocation (or pool create) exists for which a traceback has not been tested, the application can subsequently determine whether the current iteration of the test has run to completion 911.

If a memory allocation (or pool create) exists for which a traceback has not been captured, the application can proceed to capture that traceback 914 and compare it to the unique traceback 906 being tested. If the application does not determine that a captured traceback 905 matches the unique traceback 906 being tested (the traceback from step B), the application can subsequently determine 915 whether the current iteration of the test has run to completion 911. If the application does determine 915 that a captured traceback 905 matches the unique traceback 906 being tested, the application can set a "null" allocation 916 with respect to the unique traceback 906. Additionally, the application can allow the remainder of the current iteration of the test to execute 917 (e.g., without checking any further allocations of unique tracebacks 906 on the list).

While the remainder of the current iteration of the test is running, the application can monitor the test to determine whether the current iteration of the test gets an exception 918 (e.g., crashes). If the current iteration of the test does not get an exception 918, in some implementations, the application can next determine if the current iteration of the test gets hung in an infinite loop 919 (e.g., gets locked up). If the current iteration of the test does not get hung in an infinite loop 919, in some implementations, the application can next determine if any unique tracebacks 906 are left to be tested 908 (step A).

If the current iteration of the test gets an exception 918, the application can save the unique traceback being tested (i.e., the current traceback being tested) along with a traceback of the exception 920 (step C). In some implementations, the application can next determine if any unique tracebacks 906 are left to be tested 908 (step A). Additionally, if the application determines that unique tracebacks 906 are left to be tested 908, the application can be restarted 909 and subsequently run the next iteration of the test using the first traceback off the unique traceback list 910.

If the current iteration of the test gets hung in an infinite loop 919, the application can save the unique traceback (i.e., the current unique traceback being tested) along with information indicating that the current unique traceback locked up during the test 921 (step D). In some implementations, the application can next determine if any unique tracebacks 906 are left to be tested 908 (step A). Additionally, if the application determines that unique tracebacks 906 are left to be tested 908, the application can be restarted 909 and subsequently run the next iteration of the test using the first traceback off the list 910.

If the application determines 908 that the first iteration of the test has been completed, the application can next determine 922 whether any unique tracebacks 906 exist (e.g., on list 912) for which captured tracebacks 905 were not found. If application determines that a unique traceback 906 exists for which a captured traceback was not found, the application can restart step A 923 using a unique traceback for which a captured traceback was not found. Additionally, the application can run the next iteration of the test 910 using a unique traceback for which a captured traceback was not found. Alternatively, if the application determines that no unique traceback 906 exists for which a captured traceback was not found, the application can proceed to print out a report of all captured problems 924.

FIG. 10 shows an example display of a test for specific tracebacks. In some implementations, a window 1001 (e.g., a DOS window) can be used to implement instructions for executing an application (e.g., a Root Cause Interface Application or "RIA") and a file 1002 (e.g., a configuration file for a null probe). The window can enumerate particular tracebacks to be tested (e.g., unique tracebacks). For example, an indication (e.g., only TKEDSExecute 1003) can limit which tracebacks will be tested. In this example, only tracebacks that include "TKEDSExecute" will be executed.

Figure 11B:
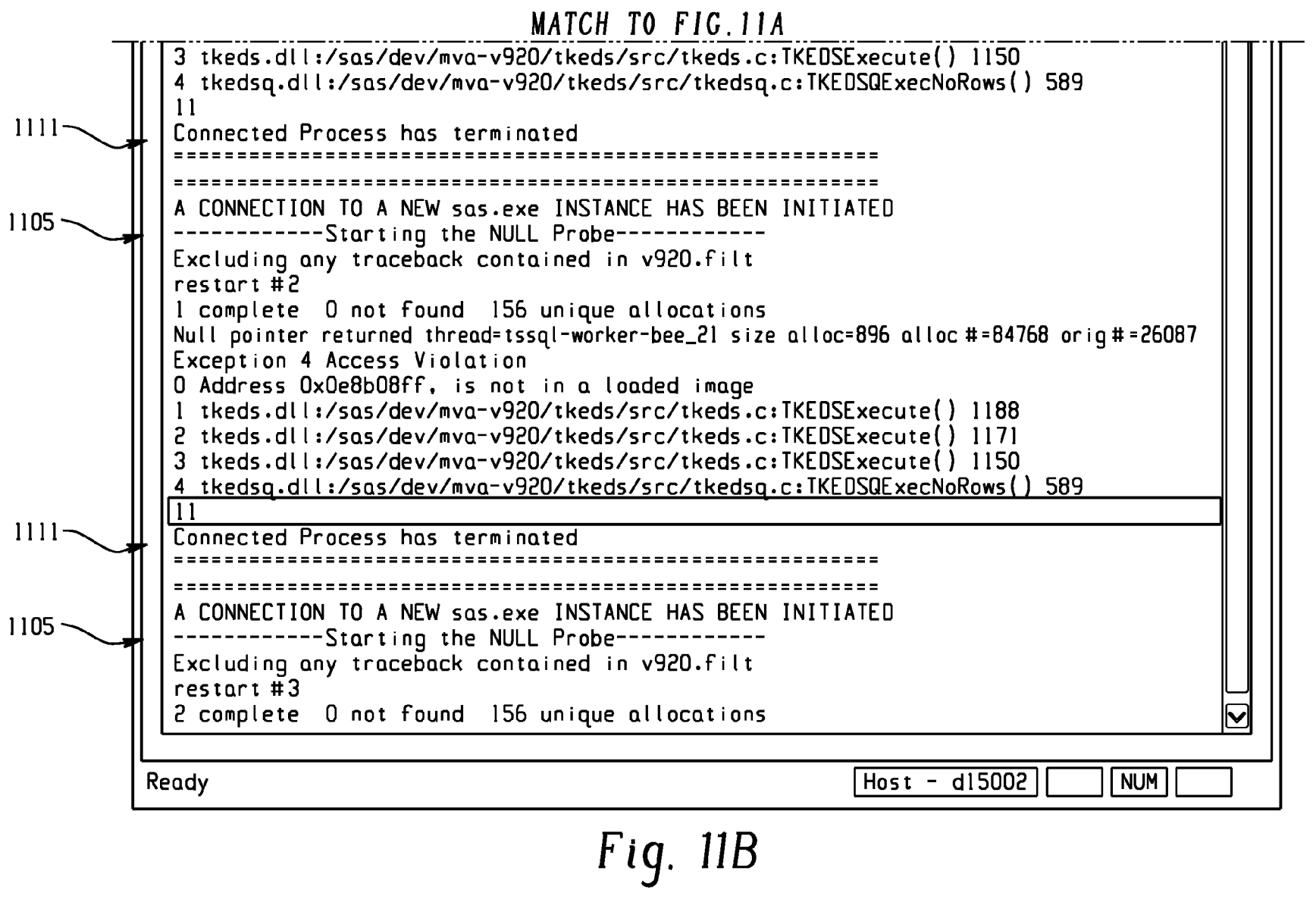

FIGS. 11A and 11B show an example display of an interface application or RIA window 1101 indicating the specific traceback being tested. In some implementations, the RIA window 1101 can correspond to the RootCause Interface Application 1102 executed in the DOS window 1101. The RIA window can include one or more buttons (e.g., "stop" button 1102, "kill" button 1103, and "again" button 1104), which can facilitate user interaction with the application. RIA window 1101 includes an indication 1105 that a process (e.g., the null probe) has started. Additionally, RIA window 1101 includes an indication 1106 that a filter (e.g., v920.filt) is being applied, and an indication 1107 that only tracebacks containing "TKEDSExecute" will be considered "unique tracebacks." At 1108, the RIA window 1101 includes an indication that a count phase (which is part of the capture phase) will be run (e.g., to determine a number of unique allocations). Once the count phase has finished, the RIA window 1101 can include an indication 1109 that the filters are checked.

In RIA window 1101, an indication 1110 displays the results of the count phase. Specifically, 26,876 total allocations were tested, 5,303+156 unique allocations were discovered and 5,303 of those allocations were filtered (e.g., because they did not contain the "TKEDSExecute"). Additionally, RIA window 1101 can include one or more indications 1111 that an iteration of the test caused the application to terminate (e.g., by producing a crash). In some implementations, when the application terminates, a new version of the application can be started 1105. In these implementations, the application can begin testing unique tracebacks from the point at which the application terminated during a last iteration of the test.

FIGS. 12A and 12B show another example display of the interface application window including an incremental count of iterations being tested. As noted with reference to FIGS. 11A and 11B above, 26,876 total allocations were tested during the count phase. As shown in FIGS. 12A and 12B, following a first few iterations of the test which caused the application to terminate, subsequent iterations of the test do not cause the application to terminate. Additionally, as shown in RIA window 1201, each subsequent successful iteration of the test can allow the count to increment 1201. In some implementations, the count will continue to increment until the count matches the total number of allocations tested during the count phase (i.e., 26,876). FIGS. 13A and 13B show yet another example display of the interface application window including the last iteration tested.

Figure 14:
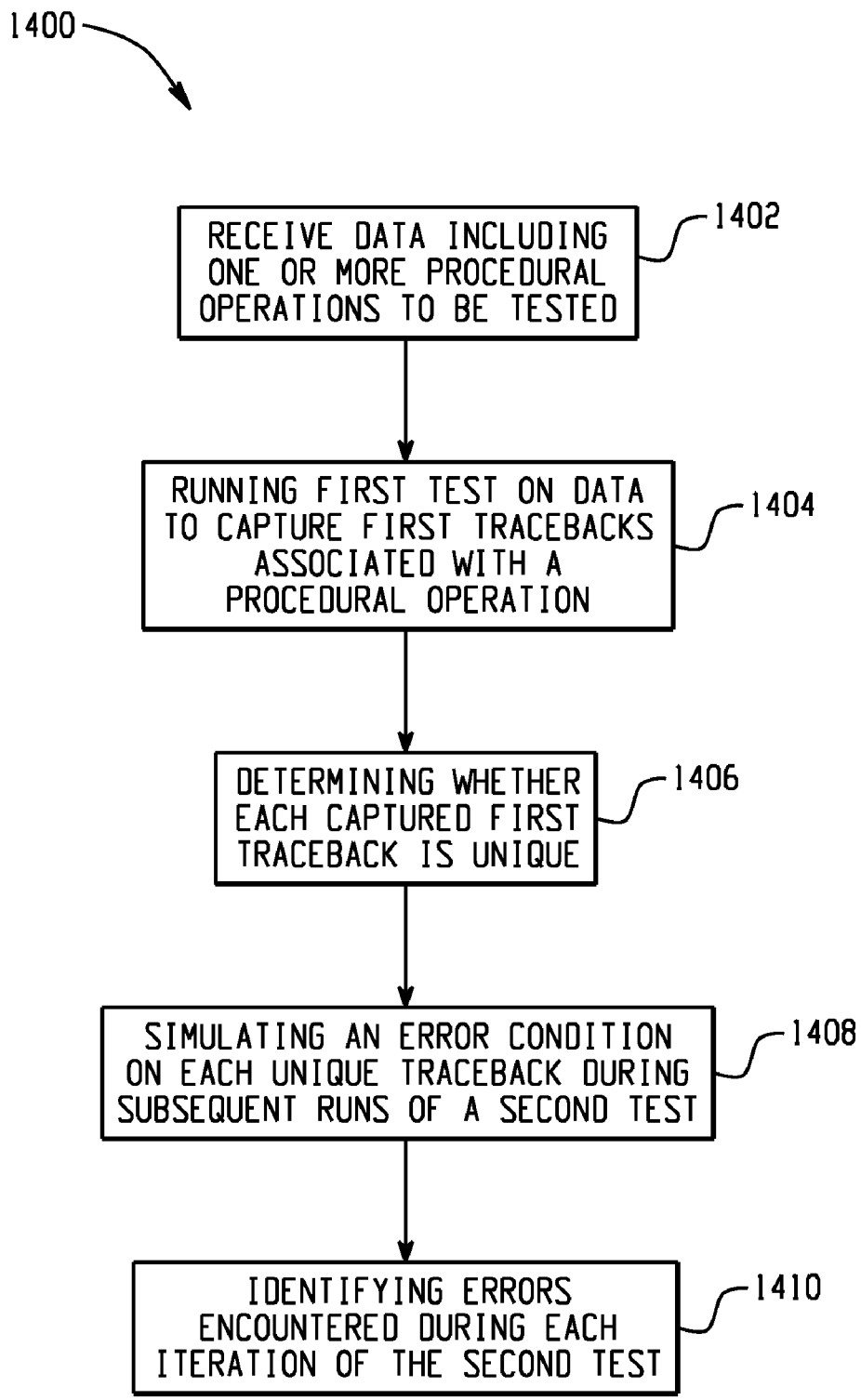
FIG. 14 is a flow diagram depicting a computer-implemented method for automated determination of error handling.

FIG. 14 is a flow diagram depicting a computer-implemented method for automated determination of error handling. At 1402, data including one or more procedural operations to be testing is received. At 1404, a first test is run on the data to capture one or more first tracebacks, where each captured first traceback is associated with a procedural operation. At 1406, it is determined whether each captured first traceback is unique, where unique tracebacks are added to a unique traceback list. At 1408, an error condition is simulated on each unique traceback on the unique traceback list by running a second test, where the second test is run once for each unique traceback, where one or more second tracebacks are captured during each run of the second test, where when a unique traceback being tested matches a captured second traceback, an error code is returned and the second test is run to completion. At 1410, errors encountered during each iteration of the second test running to completion are identified.

Figure 15A:
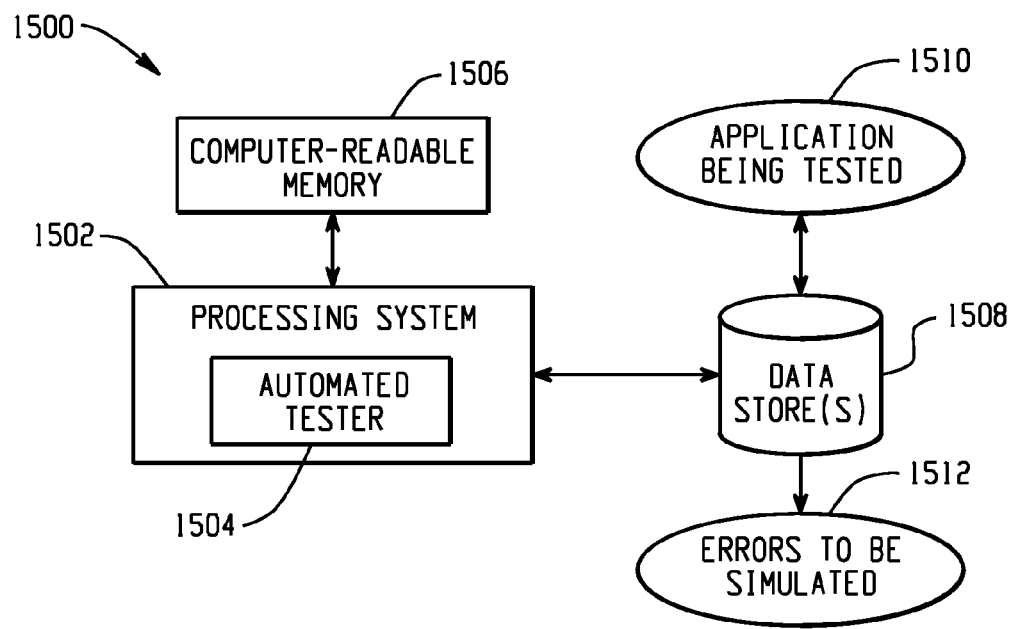
FIGS. 15A, 15B, and 15C depict example systems for automated determination of error handling.
Figure 15B:
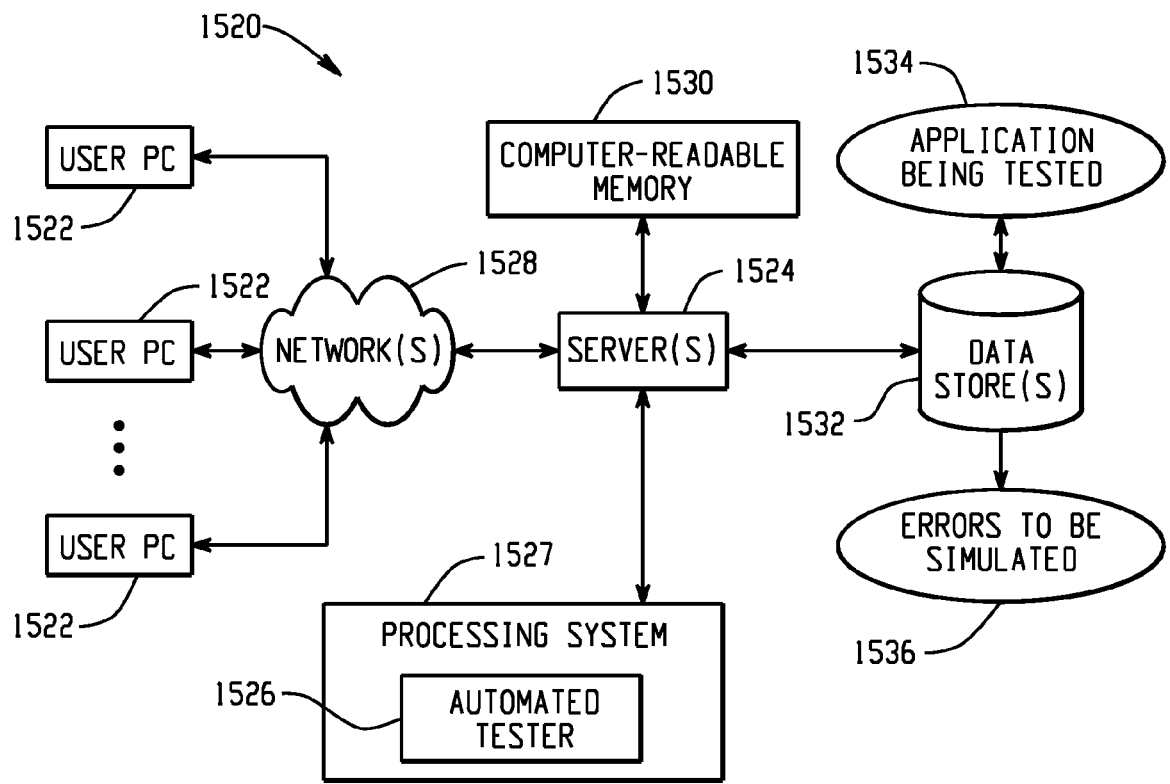
Figure 15C:
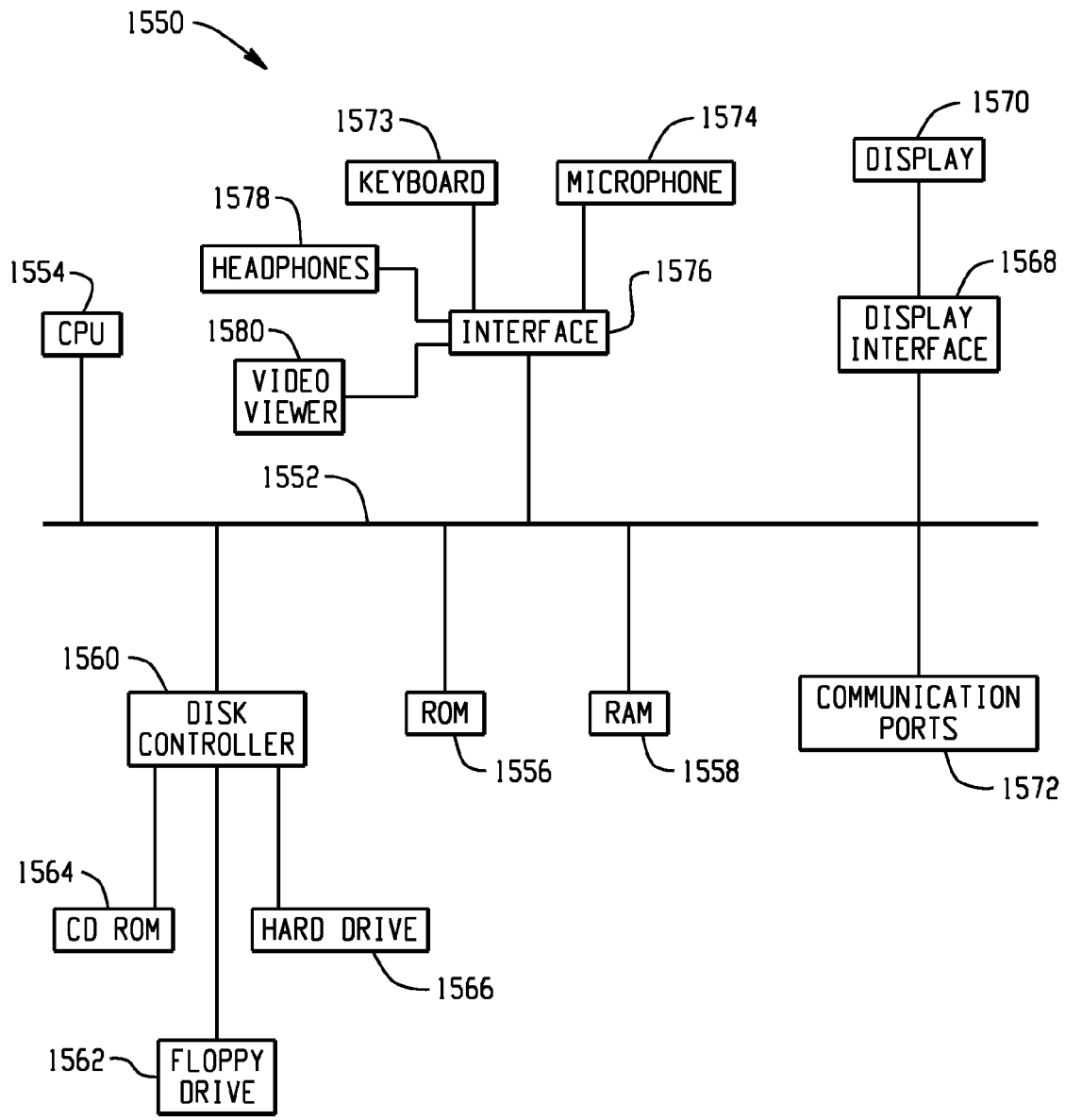

FIGS. 15A, 15B, and 15C depict example systems for automated determination of error handling. For example, FIG. 15A depicts an exemplary system 1500 that includes a stand alone computer architecture where a processing system 1502 (e.g., one or more computer processors) includes a system for automated determination of error handling 1504 being executed on it. The processing system 1502 has access to a computer-readable memory 1506 in addition to one or more data stores 1508. The one or more data stores 1508 may contain applications to be tested 1510 as well as errors to be simulated 1512.

FIG. 15B depicts a system 1520 that includes a client server architecture. One or more user PCs 1522 accesses one or more servers 1524 running a system for automatically determining error handling 1526 on a processing system 1527 via one or more networks 1528. The one or more servers 1524 may access a computer readable memory 1530 as well as one or more data stores 1532. The one or more data stores 1532 may contain applications to be tested 1534 as well as errors to be simulated 1536.

FIG. 15C shows a block diagram of exemplary hardware for a stand alone computer architecture 1550, such as the architecture depicted in FIG. 15A, that may be used to contain and/or implement the program instructions of system embodiments of the present invention. A bus 1552 may serve as the information highway interconnecting the other illustrated components of the hardware. A processing system 1554 labeled CPU (central processing unit) (e.g., one or more computer processors), may perform calculations and logic operations required to execute a program. A processor-readable storage medium, such as read only memory (ROM) 1556 and random access memory (RAM) 1558, may be in communication with the processing system 1554 and may contain one or more programming instructions for automatically determining error handling. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1560 interfaces with one or more optional disk drives to the system bus 1552. These disk drives may be external or internal floppy disk drives such as 1562, external or internal CD-ROM, CD-R, CD-RW or DVD drives such as 1564, or external or internal hard drives 1566. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1560, the ROM 1556 and/or the RAM 1558. Preferably, the processor 1554 may access each component as required.

A display interface 1568 may permit information from the bus 1552 to be displayed on a display 1570 in audio, graphic, or alphanumeric format. Communication with external devices may optionally occur using various communication ports 1572.

In addition to the standard computer-type components, the hardware may also include data input devices, such as a keyboard 1573, or other input device 1574, such as a microphone, remote control, pointer, mouse and/or joystick.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results It is claimed:

1. A computer-implemented method for automated determination of error handling, comprising:
   receiving, using one or more processors, data including one or more procedural operations to be tested;
   running, using the one or more processors, a first test on the data to capture one or more first tracebacks, wherein each captured first traceback is associated with a procedural operation;
   determining, using the one or more processors, whether each captured first traceback is unique, wherein unique tracebacks are added to a unique traceback list;
   simulating, using the one or more processors, an error condition on each unique traceback on the unique traceback list by running a second test, wherein the second test is run once for each unique traceback; wherein one or more second tracebacks are captured during each run of the second test, wherein when a unique traceback being tested matches a captured second traceback, an error code is returned and the second test is run to completion; and
   identifying, using the one or more processors, errors encountered during each iteration of the second test running to completion.

2. The method of claim 1, wherein the procedural operation is selected from the group comprising: a memory procedure, an I/O procedure, and a TCP procedure.

3. The method of claim 1, wherein running the second test includes capturing a second traceback for each procedural operation encountered while running the second test.

4. The method of claim 1, wherein a traceback is at least ten lines.

5. The method of claim 1, further comprising:
   filtering one or more first tracebacks from the unique traceback list prior to simulating the error condition.

6. The method of claim 1, further comprising:
   saving the unique traceback list.

7. The method of claim 1, further comprising:
   restarting an application being tested for each run of the second test.

8. The method of claim 1, wherein the first test includes executing an application to identify one or more first tracebacks associated with the one or more procedural operations to be tested;
   wherein each run of the second test includes:
      reexecuting the application for the next unique traceback on the unique traceback list; and
      simulating the error condition when a procedural operation associated with the next unique traceback is encountered, wherein encountering occurs when the next unique traceback matches a captured second traceback.

9. The method of claim 1, wherein when a captured second traceback matches the unique traceback being tested, an error code is returned, the second test finishes, and a remainder of the unique traceback list is saved and the second test is restarted.

10. The method of claim 1, further comprising:
    determining a crash, wherein when a crash is determined: a crash traceback is captured and saved along with the unique traceback being tested, a remainder of the unique traceback list is saved, and a current run of the second test is terminated.

11. The method of claim 10, further comprising:
    generating a reason for the crash by analyzing the crash traceback.

12. The method of claim 11, wherein the reason indicates the crash resulting from an improperly handled error condition.

13. The method of claim 1, further comprising:
    determining a lock up, wherein when a lock up is determined: a remainder of the unique traceback list is saved, and a current run of the second test is terminated.

14. The method of claim 13, further comprising:
    generating a reason for the lock up.

15. The method of claim 14, wherein the reason indicates the lock up resulting from an improperly handled error condition.

16. The method of claim 1, wherein running the second test includes determining a result including a crash or a lock up.

17. The method of claim 16, wherein a reason for the determined result is identified and stored.

18. The method of claim 1, wherein the processor-implemented system includes a client-server based system or a stand-alone computer based system.

19. A computer-program product, tangibly embodied in a machine-readable storage medium, including instructions operable to cause one or more data processors to perform a method for automated determination of error handling, the method comprising:
    receiving data including one or more procedural operations to be tested;
    running a first test on the data to capture one or more first tracebacks;
    determining whether each captured first traceback is unique, wherein unique tracebacks are added to a unique traceback list;
    simulating an error condition on each unique traceback on the unique traceback list by running a second test, wherein the second test is run once for each unique traceback; wherein one or more second tracebacks are captured during each run of the second test, wherein when a unique traceback being tested matches a captured second traceback, an error code is returned and the second test is run to completion; and
    identifying errors encountered during each iteration of the second test running to completion.

20. A system, comprising:
    one or more processors;
    one or more computer-readable storage mediums containing instructions configured to cause the one or more processors to perform operations including performing a method for automated determination of error handling, the method comprising:
       receiving data including one or more procedural operations to be tested;
       running a first test on the data to capture one or more first tracebacks;
       determining whether each captured first traceback is unique, wherein unique tracebacks are added to a unique traceback list;

simulating an error condition on each unique traceback on the unique traceback list by running a second test, wherein the second test is run once for each unique traceback; wherein one or more second tracebacks are captured during each run of the second test, wherein when a unique traceback being tested matches a captured second traceback, an error code is returned and the second test is run to completion; and identifying errors encountered during each iteration of the second test running to completion.

* * * * *